US010509297B2

(12) United States Patent
Kafaie Shirmanesh et al.

(10) Patent No.: US 10,509,297 B2
(45) Date of Patent: Dec. 17, 2019

(54) CONTINUOUS BEAM STEERING WITH MULTIPLE-GATED RECONFIGURABLE METASURFACES

(71) Applicant: California Institute of Technology, Pasadena, CA (US)

(72) Inventors: Ghazaleh Kafaie Shirmanesh, Pasadena, CA (US); Ruzan Sokhoyan, Pasadena, CA (US); Harry A Atwater, South Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 87 days.

(21) Appl. No.: 15/881,689

(22) Filed: Jan. 26, 2018

(65) Prior Publication Data

US 2019/0033682 A1  Jan. 31, 2019

Related U.S. Application Data

(60) Provisional application No. 62/451,530, filed on Jan. 27, 2017.

(51) Int. Cl.
*G02F 1/29* (2006.01)
*H01Q 3/44* (2006.01)

(52) U.S. Cl.
CPC .............. *G02F 1/292* (2013.01); *G02F 1/29* (2013.01); *H01Q 3/44* (2013.01)

(58) Field of Classification Search
CPC .............. G02F 1/292; G02F 1/29; H01Q 3/44
See application file for complete search history.

(56) References Cited

U.S. PATENT DOCUMENTS

| | | | |
|---|---|---|---|
| 9,496,610 B2 | 11/2016 | Blech | |
| 2013/0170020 A1 | 7/2013 | Davis | |
| 2016/0170237 A1 | 6/2016 | Han et al. | |
| 2016/0223723 A1 | 8/2016 | Han et al. | |

FOREIGN PATENT DOCUMENTS

JP       4952934 B2    6/2012

OTHER PUBLICATIONS

Arbabi, A., et al. "Dielectric metasurfaces for complete control of phase and polarization with subwavelength spatial resolution and high transmission", *Nature Nanotechnology* 10, 937-943, (Nov. 2015). 8 pages.
Bayer, T. J.M., et al. "Atomic Layer Deposition of Al2O3 onto Sn—Doped In2O3: Absence of Self-Limited Adsorption during Initial Growth by Oxygen Diffusion from the Substrate and Band Offset Modification by Fermi Level Pinning in Al2O3", *Chemistry of Materials* 24, 4503-4510, (2012). 8 pages.

(Continued)

*Primary Examiner* — Wen Huang
(74) *Attorney, Agent, or Firm* — Steinfl + Bruno, LLP

(57) ABSTRACT

An array of unit cells allows beam steering of an incident electromagnetic wave. Each unit cell has a back reflector, a conductive oxide between gate dielectrics, and an antenna. Voltage bias applied to different layers enables the accumulation or depletion of charges at the top and bottom interfaces of the conductive oxide. The charge accumulation and depletion regions control the refractive index of the material, enabling control of the reflected electromagnetic wave.

17 Claims, 21 Drawing Sheets

(56) References Cited

OTHER PUBLICATIONS

Black, L.-J., et al. "Optimal Polarization Conversion in Coupled Dimer Plasmonic Nanoantennas for Metasurfaces", *ACS Nano* 8(6), 6390-6399, (May 2014). 10 pages.

Cao, D., et al. "Low-temperature plasma-enhanced atomic layer deposition of HfO2/Al2O3 nanolaminate structure on Si", *Journal of Vacuum Science & Technology B* 33(1), 01A101, (Jan. 2015). 6 pages.

Cencillo-Abad, P., et al. "Random access actuation of nanowire grid metamaterial", *Nanotechnology* 27, 485206, (2016). 7 pages.

Chen, W. T., et al. "High-Efficiency Broadband Meta-Hologram with Polarization-Controlled Dual images", *Nano Letters* 14, 225-230, (2014). 6 pages.

Dabidian, N., et al. "Electrical Switching of Infrared Light Using Graphene Integration with Plasmonic Fano Resonant Metasurfaces", *ACS Photonics* 2, 216-227, (2015). 12 pages.

De Galarreta, C.R., et al. "Nonvolatile Reconfigurable Phase-Change Metadevices for Beam Steering in the Near infrared", *Advanced Functional Materials* 1704993, (2018). 10 pages.

Decker, M., et al. "Electro-optical switching by liquid-crystal controlled metasurfaces", *Optics Express* 21(7), 8879-8885, (Apr. 2013), 7 pages.

Feigenbaum, E., et al. "Unity-Order Index Change in Transparent Conducting Oxides at Visible Frequencies", *Nano Letters* 10, 2111-2116, (2010). 6 pages.

Heck, M.J.R. "Highly integrated optical phased arrays: photonic integrated circuits for optical beam shaping and beam steering", *Nanophotonics* 6(1), 93-107, (2017). 15 pages.

Hinkle; C. L., et al. "GaAs interfacial self-cleaning by atomic layer deposition"; *Applied Physics Letters* 92, 071901, (2008). 4 pages.

Huang, Y.-W., et al. "Aluminum Plasrnonic Multicolor Meta-Hologram", *Nano Letters* 15, 3122-3127, (2015). 6 pages.

Huang, Y.-W., et al., "Gate-Tunable Conducting Oxide Metasurfaces", *Nano Letters* 16, 5319-5325, (2016), 7 pages.

Iyer, P. P., et al. "Ultrawide thermal free-carrier tuning of dielectric antennas coupled to epsilon-near-zero substrates", *Nature Communications* 8, 472, (2017), 7 pages.

Jun, Y. C., et al. "Epsilon-Near-Zero Strong Coupling in Metamaterial-Semiconductor Hybrid Structures", *Nano Letters* 13, 5391-5396, (2013). 6 pages.

Khorasaninejad, M., et al. "Metalenses at visible wavelengths: Diffraction-limited focusing and subwavelength resolution imaging", *Science* 352(6290), 1190-1194, (Jun. 2016). 6 pages.

Kim, J.S., et al. "Hall measurements of treated indium tin oxide surfaces", *Synthetic Metals* vols. 111-112, 363-367, (2000), 5 pages.

Klein, A., et al. "Transparent Conducting Oxides for Photovoltaics: Manipulation of Fermi Level, Work Function and Energy Band Alignment", *Materials* 3, 4892-4914; (2010). 23 pages.

Lee, H. W., et al. "Nanoscale Conducting Oxide PlasMOStor", *Nano Letters* 14, 6463-6468, (2014). 6 pages.

Lee. J., et al. "On-Demand Reconfiguration of Nanomaterials: When Electronics Meets Ionic's", *Advanced Materials* 30, 1702770, (2018). 33 pages.

Lewi, T., et al. "Ultrawide Thermo-optic Tuning of PbTe Meta-Atoms", *Nano Letters* 17; 3940-3945, (2017). 6 pages.

Li, X., et al. "Saturated blue-violet electroluminescence from single ZnO micro/nanowire and p-GaN film hybrid light-emitting diodes", *Applied Physics Letters* 102, 221103, (2013). 5 pages.

Lu, Z., et al. "Ultracompact Electroabsorption Modulators Based on Tunable Epsilon-Near-Zero-Slot Waveguides", *IEEE Photonics Journal* 4(3), 735-740, (Jun. 2012). 7 pages.

Melikyan, A., et al. "Surface plasmon polariton absorption modulator", *Optics Express* 19(9), 8855-8869, (Apr. 2011). 15 pages.

Michelotti, F., et al. "Thickness dependence of surface plasmon polariton dispersion in transparent conducting oxide films at 1.55 mm", *Optics Letters* 34(6), 839-841, (Mar. 2009). 3 pages.

Olivieri, A., et al. "Plasmonic Nanostructured Metal-Oxide-Semiconductor Reflection Modulators", *Nano Letters* 15, 2304-2311, (2015). 8 pages.

Ou, J.-Y., et al. "An electromechanically reconfigurabie plasmonic metamaterial operating in the near-infrared", *Nature Nanotechnology* 8, 252-255, (Apr. 2013). 6 pages.

Park, J., et al. "Electrically Tunable Epsilon-Near-Zero (ENZ) Metafilm Absorbers", *Scientific Reports* 5, 15754, (Nov. 2015). 9 pages.

Pors, A., et al. "Broadband Focusing Flat Mirrors Based on Plasmonic Gradient Metasurfaces", *Nano Letters* 13, 829-834, (2013). 6 pages.

Poulton, C. V., et al. "Coherent solid-state LIDAR with silicon photonic optical phased arrays", *Optics Letters* 42(20), 4091-4094, (Oct. 2017).

Sautter, J., et al. "Active Tuning of All-Dielectric Metasurfaces", *ACS Nano* 9(4), 4308-4315, (Mar. 2015). 8 pages.

Sherrott, M.C., et al. "Experimental Demonstration of 230° Phase Modulation in Gate-Tunable Graphene-Gold Reconfigurable Mid-Infrared Metasurfaces", *Nano Letters* 17, 3027-3034, (2017). 8 pages.

Sun, J., et al. "Large-scale nanophotonic phased array", *Nature* 493, 195-199, (Jan. 2013). 6 pages.

Thyagarajan, K., et al. "Millivolt Modulation of Plasmonic Metasurface Optical Response via Ionic Conductance", *Advanced Materials* 29, 1701044, (2017), 8 pages.

Valente, J., et al. "A magneto-electro-optical effect in a plasmonic nanowire material", *Nature Communications* 6, 7021, (Apr. 2015). 7 pages.

Vasudev, A.P., et al. "Electro-optical modulation of a silicon waveguide with an "epsilon-near-zero" material", *Optics Express* 21(22), 26387-26397, (Nov. 2013). 11 pages.

Wu, P. C., et al. "Versatile Polarization Generation with an Aluminum Plasmonic Metasurface", *Nano Letters* 17, 445-452, (2017). 6 pages.

Yaacobi, A., et al. "Integrated phased array for wide-angle beam steering", *Optics Letters* 39(15), 4575-4578, (Aug. 2014). 4 pages.

Yao, Y., et al. "Broad Electrical Tuning of Graphene-Loaded Plasmonic Antennas", *Nano Letters* 13, 1257-1264, (2013). 8 pages.

Ye, P.D.; et al. "GaN metal-oxide-semiconductor high-electron-mobility-transistor with atomic layer deposited Al2O3 as gate dielectric", *Applied Physics Letters* 86, 063501, (2005). 4 pages.

Yota, J., et al. "ALD HfO2, Al2O3, and PECVD Si3N4 as MIM Capacitor Dielectric for GaAs HBT Technology", *The International Conference on Compound Semiconductor Manufacturing Technology, CS ManTech* (2014). 4 pages.

Yu, N., et al. "Flat optics with designer metasurfaces", *Nature Materials* 13, 139-150, (Feb. 2014). 12 pages.

Yu, N., et al. "Light Propagation with Phase Discontinuities: Generalized Laws of Reflection and Refraction", *Science* 334(6054), 333-337, (Oct. 2011). 6 pages.

Zheng, G., et al. "Metasurface holograms reaching 80% efficiency", *Nature Nanotechnology* 10, 308-312, (Feb. 2015). 6 pages.

Zhu, Z., et al. "Dynamically Reconfigurable Metadevice Employing Nanostructured Phase-Change Materials", *Nano Letters* 17, 4881-4885, (2017). 5 pages.

International Search Report for International Application No. PCT/US2018/015605 filed Jan. 26, 2018 on behalf of California Institute of Technology, dated Jun. 22, 2018. 3 pages.

Lu, et al., "On-Demand Reconfiguration of Nanomaterials: When Electronics Meets Ionics", Advanced Materials, (Jan. 4, 2018), 30, 1702770, 33 pages.

Written Opinion for International Application No. PCT/US2018/015605 filed Jan. 26, 2018 on behalf of California Institute of Technology, dated Jun. 22, 2018. 5 pages.

Yi, F., et al, "Voltage tuning of plasmonic absorbers by indium tin oxide", Applied Physics Letters, 102, 221102 (Jun. 2013). 6 pages.

Yu-Capasso, "Flat Optics Based on Metasurfaces", Nature Materials, 13, 139, (Jan. 24, 2014). 31 pages.

CONTINUOUS BEAM STEERING WITH MULTIPLE-GATED RECONFIGURABLE METASURFACES

CROSS REFERENCE TO RELATED APPLICATIONS

The present application claims priority to U.S. Provisional Patent Application No. 62/451,530, filed on Jan. 27, 2017, the disclosure of which is incorporated herein by reference in its entirety.

TECHNICAL FIELD

The present disclosure relates to reconfigurable metasurfaces. More particularly, it relates to continuous beam steering with multiple-gated reconfigurable metasurfaces.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
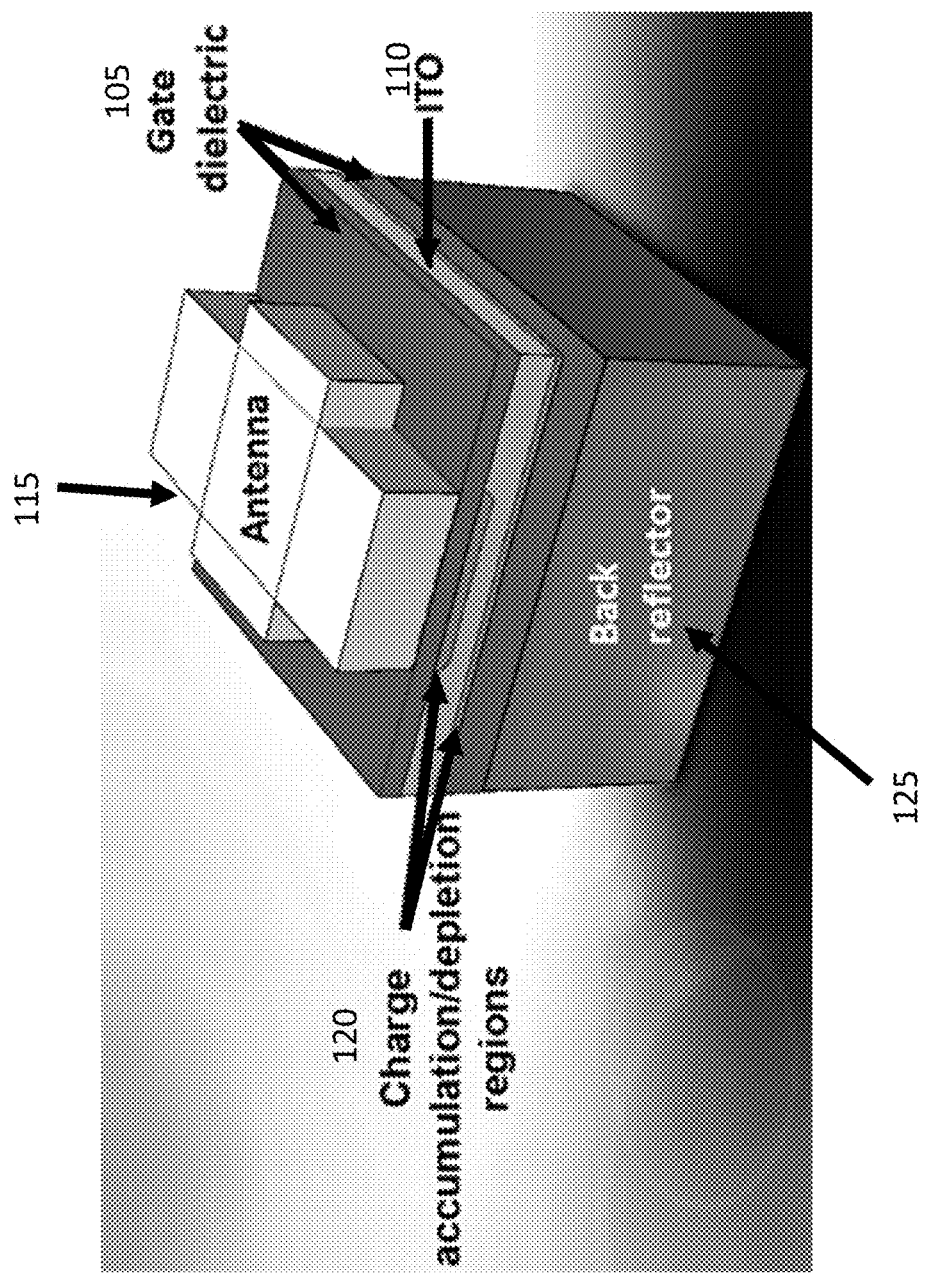
FIGS. 1-2 illustrate an exemplary implementation of the devices of the present disclosure.

In a first aspect of the disclosure, a structure is described, the structure comprising: a back reflector; a first gate dielectric on the back reflector; a transparent index-change layer on the first gate dielectric, the transparent index-change layer having an electrically tunable refractive index; a second gate dielectric on the transparent index-change layer; an antenna on the second gate dielectric, a first electric conductor between the transparent index-change layer and the first gate dielectric, the first electric conductor configured to apply a first voltage bias between the transparent index-change layer and the first gate dielectric; and a second electric conductor between the transparent index-change layer and the first second gate dielectric, the second electric conductor configured to apply a second voltage bias between the transparent index-change layer and the second gate dielectric, wherein: the first voltage bias is configured to generate a first charge accumulation layer or first charge depletion layer between the transparent index-change layer and the first gate dielectric, and the second voltage bias is configured to generate a second charge accumulation layer or second charge depletion layer between the transparent index-change layer and the second gate dielectric.

In a second aspect of the disclosure, a structure is described, the structure comprising: a back reflector; an antenna; a plurality of gate dielectric layers between the antenna and the back reflector; a plurality of transparent index-change layer between the antenna and the back reflector, each transparent index-change layer between two gate dielectric layers of the plurality of gate dielectric layers; and a plurality of electric conductors, each conductor of the plurality of electric conductors connecting a transparent index-change layer of the plurality of transparent index-change layers to: the antenna, the back reflector, or another transparent index-change layer of the plurality of transparent index-change layers, wherein: each electric conductor of the plurality of electric conductors is configured to apply a voltage bias to a transparent index-change layer of the plurality of transparent index-change layers and generate a charge accumulation layer or a charge depletion layer between the transparent index-change layer of the plurality of transparent index-change layers and adjacent gate dielectric layers.

DETAILED DESCRIPTION

The present application describes multi-gate tunable optical devices that allow control over several properties of electromagnetic waves, such as amplitude, phase, and polarization. The light characteristics can be controlled through a tunable material that has a variable refractive index. The index of refraction of the material can be controlled by the application of an electrical bias. A device as described in the present disclosure may therefore comprise a material with a controllable refractive index, which can be termed "index-change material", integrated into the device together with means to apply the bias which controls the refractive index. A layer made of an "index-change material" may be referred to as an "index-change layer".

In some embodiments, a single layer of index change material can be used, while in other embodiments multiple different layers of index change materials are integrated into the device. The different layers may comprise layers of the same material, or each layer may comprise a different material. In other embodiments, the material of each layer may be chosen according to the desired specification, and may be different or the same as the material of adjacent layers. In some embodiments, the devices described herein may comprise multiple gates. The multi-gate optical devices of the present disclosure allow simultaneous application of multiple independent bias voltages.

The devices described herein may find applications in different technological areas, such as, for example, reconfigurable beam steering devices, dynamic holograms, tunable ultrathin lenses, nanoprojectors, and nanoscale spatial light modulators.

Figure 2:
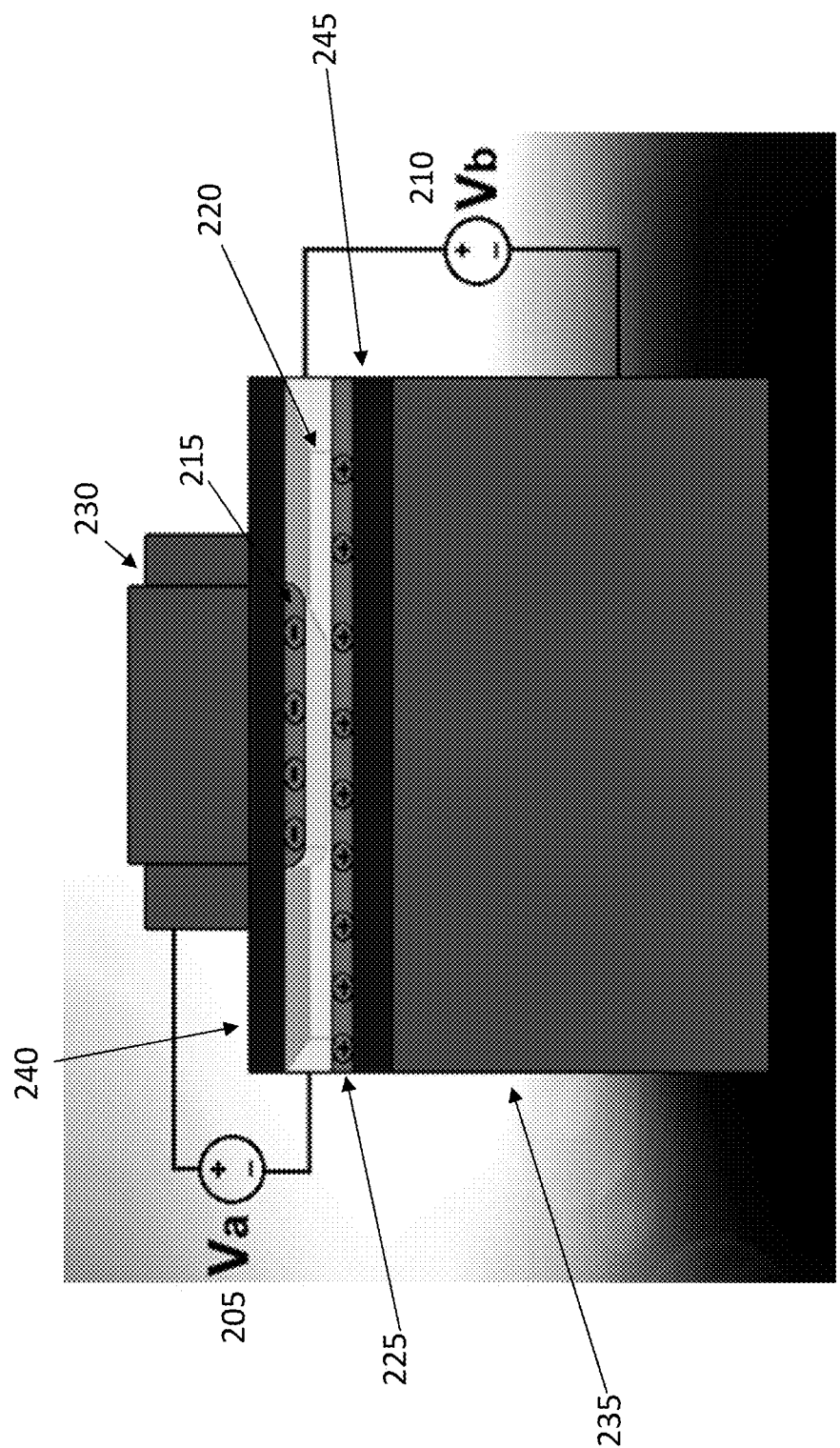

FIGS. 1-2 illustrate an exemplary implementation of the devices of the present disclosure. In some embodiments, the devices of the present disclosure comprise one or more metasurfaces with a unit cell consisting of a back reflector, a first layer of a gate dielectric, an index change material, and a second layer of a gate dielectric. In some embodiments, the unit cell can be repeated horizontally in a plane by placing multiple unit cells adjacent to each other. Each unit cell is individually addressable. For example, such array configuration of unit cells can be used for beam steering devices. As known to the person of ordinary skill in the art, beam steering involves changing the direction of the main lobe of a radiation pattern of electromagnetic radiation. The change in directivity of a beam can be realized, for example, by controlling the parameters of each unit cell, such as for example the phase or amplitude of the radiation emitted by each unit cell, which combines with the radiation emitted by other unit cells in the array, for form a beam.

In some embodiments, indium tin oxide (ITO) can be used as an index change material, whose index of refraction can be controlled by an electrical bias. For example, a possible mechanism of the index change can be based on charge depletion or accumulation in ITO at the interface of ITO and the gate dielectric.

FIG. 1 illustrates a three-dimensional schematic of an exemplary tunable metasurface unit cell. FIG. 2 illustrates a schematic front view of the exemplary tunable metasurface unit cell of FIG. 1. FIG. 2 schematically illustrates how to apply two independent biases. One or more independent biases may be applied to a metasurface. In FIG. 1, the unit cell comprises a back reflector (125), a first and second gate dielectric layers (105) with an ITO layer (110) in between, and an antenna or emitter (115). In some embodiments, the ITO layer may be substituted by other index change materials, for example other transparent oxides. In FIG. 1, two charge accumulation or depletion regions (120) are illustrated, one at the interface of the first gate dielectric and the ITO layer, and another at the interface between the second gate dielectric and the antenna emitter (115). The accumulation or depletion interface layers can be controlled by the application of electrical biases.

FIG. 2 illustrates a first voltage bias (205) applied between the emitter (230) and the ITO layer (220), and a second voltage bias (210) applied between the back reflector (235) and the ITO layer (220). The first voltage bias can control the depletion and accumulation region (215), while the second voltage bias can control the depletion and accumulation region (225). The depletion and accumulation region can also be controlled by the shape of the layers, as for example the region (215) can substantially correspond, in its lateral extension along the interface plane, to the lateral dimension of the emitter (230). As known to the person of ordinary skill in the art, the lateral extension of the electrodes in a junction can control the charge depletion and accumulation regions in materials.

The metasurface element illustrated in FIG. 2 enables the application of two voltage biases. Electrostatically, the metasurface shown in FIG. 2 can be understood as two metal-oxide-semiconductor (MOS) capacitors connected in series. The top MOS capacitor comprises the patch antenna (230), gate dielectric (240) and ITO layer (220). The bottom MOS capacitor comprises the ITO layer (220), the gate dielectric (245) and the back reflector (235). A voltage can also be applied between the ITO layer (220) and the back reflector (235). The two voltages, in some embodiments, are independent from each other and can be chosen according to the desired accumulation or depletion regions which are necessary to apply the desired refractive index change.

In some embodiments, a metasurface element can enable the application of two or more independent voltages. In some embodiments, the layers between the antenna and the back reflector comprise a dielectric layer, a transparent conductive oxide, and another dielectric layer. In other embodiments, the layers between the antenna and the back reflector may comprise, for example, a dielectric layer, a first transparent conductive oxide, a dielectric layer, a second transparent conductive oxide, a dielectric layer, a third transparent conductive oxide, and a dielectric layer. For example, the structure may comprise an antenna, a dielectric layer, ITO, a dielectric layer, ITO, a dielectric layer, ITO, a dielectric layer, and a back reflector. In other embodiments, additional dielectric layers and transparent conductive layers may be added. Each transparent conductive oxide layer, for example each ITO layer, can have a voltage bias applied with respect to the patch antenna, or with respect to the back reflector. In some embodiments, each transparent conductive oxide layer can be electrically biased with respect to other transparent conductive oxide layers in the structure. This type of configuration allows the application of more than two independent voltage biases.

In some embodiments, the index change layer may comprise semiconductors such as transparent conducting oxides, transition metal nitrides, Si, III-V semiconductor compounds, II-VI semiconductor compounds, and any combination of one or more semiconducting materials. The gate dielectric layer may comprise single material layers such as $HfO_2$ or $Al_2O_3$, or may comprise one or more materials, for example nanolaminate layers such as alternating layers of $HfO_2$ and $Al_2O_3$. In some embodiments, the gate dielectric is made of a $HfO_2/Al_2O_3$ nanolaminate which is compatible with complementary metal-oxide semiconductors (CMOS) and is characterized by a high direct current (DC) permittivity, a high dielectric breakdown electric field, and a low leakage current. The back reflector may comprise a metallic layer for example made of Ag, Au or Al. The back reflector may also comprise a material layer with a dielectric permittivity having a negative real number value at the wavelength of operation of the device. For example, the back reflector may be made of TiN. In some embodiments, a distributed Bragg reflector (DBR) may be used as a back reflector.

The top antenna emitter may comprise a metal such as, for example, Ag, Au or Al. The antenna may also comprise a material with a dielectric permittivity having a negative real number value at the wavelength of operation of the device. In embodiments that use optical dielectric materials, a thin conductive material layer may be deposited onto the antenna to enable electrical contact.

In the present disclosure, an "optically dielectric material" or "optically dielectric" refers to a material, or a composite material such as a multilayer, for which the real part of the dielectric permittivity is positive ($Re(\varepsilon)>0$). In some embodiments, the gate dielectric and transparent conductive oxide layers together form a multilayer which is an optically dielectric material. In the present disclosure, an "optically metallic material" or "optically metallic" refers to a material, or a composite material such as a multilayer, for which the real part of the dielectric permittivity is negative ($Re(\varepsilon)<0$). For example, insulators such as $SiO_2$ or $Al_2O_3$ are optically dielectric in the operating wavelength range of the devices described herein. For example, semiconductors can be optically dielectric but they can also be optically metallic. The property of being optically dielectric or optically metallic depends on the wavelength range and the doping of the semiconductors.

In some embodiments, the patch antenna can also be a semiconductor, for example GaAs, InP, Si, or other similar semiconductors, which can also be optically dielectric. In some embodiments, it may not be possible to efficiently bias semiconductors, if the semiconductors are not sufficiently doped. One possible solution would be doping only the bottom few nanometers of the semiconductor. This local doping could in turn enable efficient voltage application. Moreover, it is also possible to benefit from the field-effect modulation of the semiconducting material that comprises the antenna, and use it as an index change material.

In some embodiments, it is possible to deposit a few nanometers of a transparent conductor (such as ITO) and then bias the transparent conductor (for example, the ITO layer) with respect to other conductive layers. This method would also enable formation of the depletion and accumulation layer in ITO, not only directly underneath antennas but between the patch antennas. In some embodiments, the back reflector does not necessary be optically metallic, as it can also be optically dielectric.

The devices described in the present disclosure enable, upon application of an electrical bias, the control of a continuous phase shift of light reflected from the metasurface. For example, the phase shift may be continuously controlled in the range from 0° to 340°. To achieve such wide phase tunability, it is possible to apply two or more independent biases to each metasurface element, or unit cell, of an array. In particular, the carrier concentration at the top interface between the conducting oxide (such as ITO) and the top gate dielectric can be increased with a first voltage bias, while the carrier concentration at the bottom interface between the conductive oxide and the bottom gate dielectric can be increased. In some embodiments, the applied biases allow the generation of charge accumulation or depletion regions at both interfaces of the transparent conducting oxide.

Continuous beam steering can be realized by applying independent biases to individual antenna elements of an array comprising multiple reflectarray metasurfaces. In some embodiments, the operating wavelength may range from visible to infrared. In some embodiments, the array of tunable optical devices is not periodic. For example, the array may comprise reflectarray antennas that have different geometry, for example having two or more groups of antennas, with each group of electrically tunable metasurfaces having a different geometry.

Figure 3:
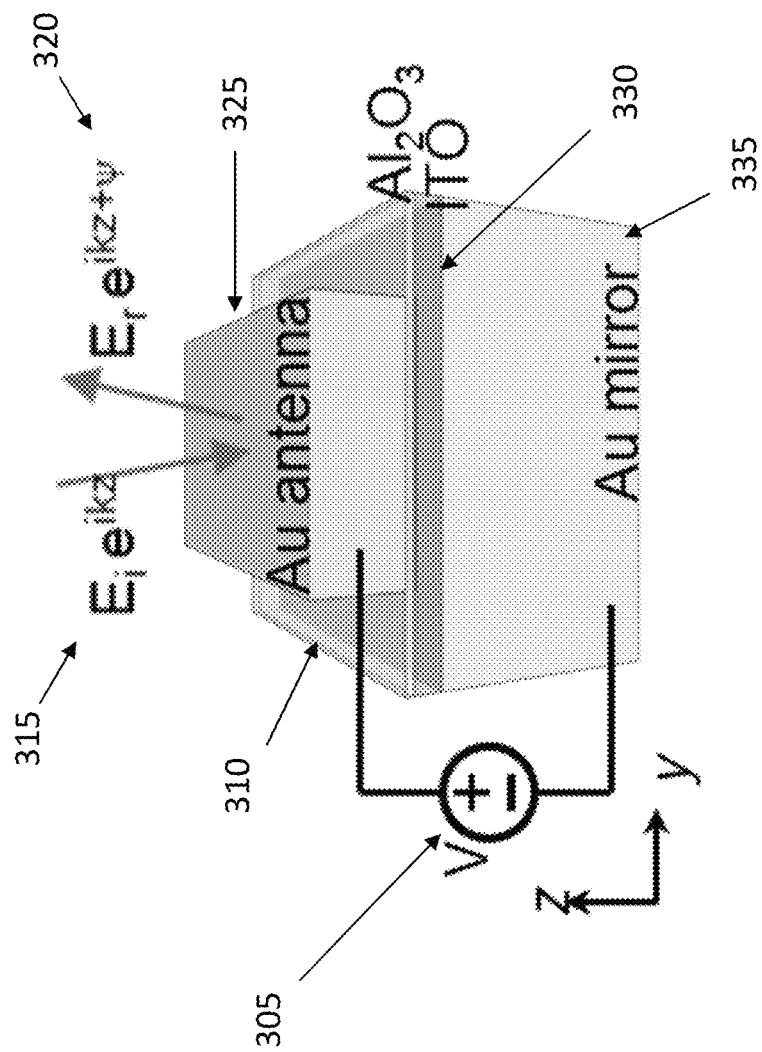
FIGS. 3-4 illustrate an electrically tunable emitter unit cell, and related measurements according to the prior art.
Figure 4:
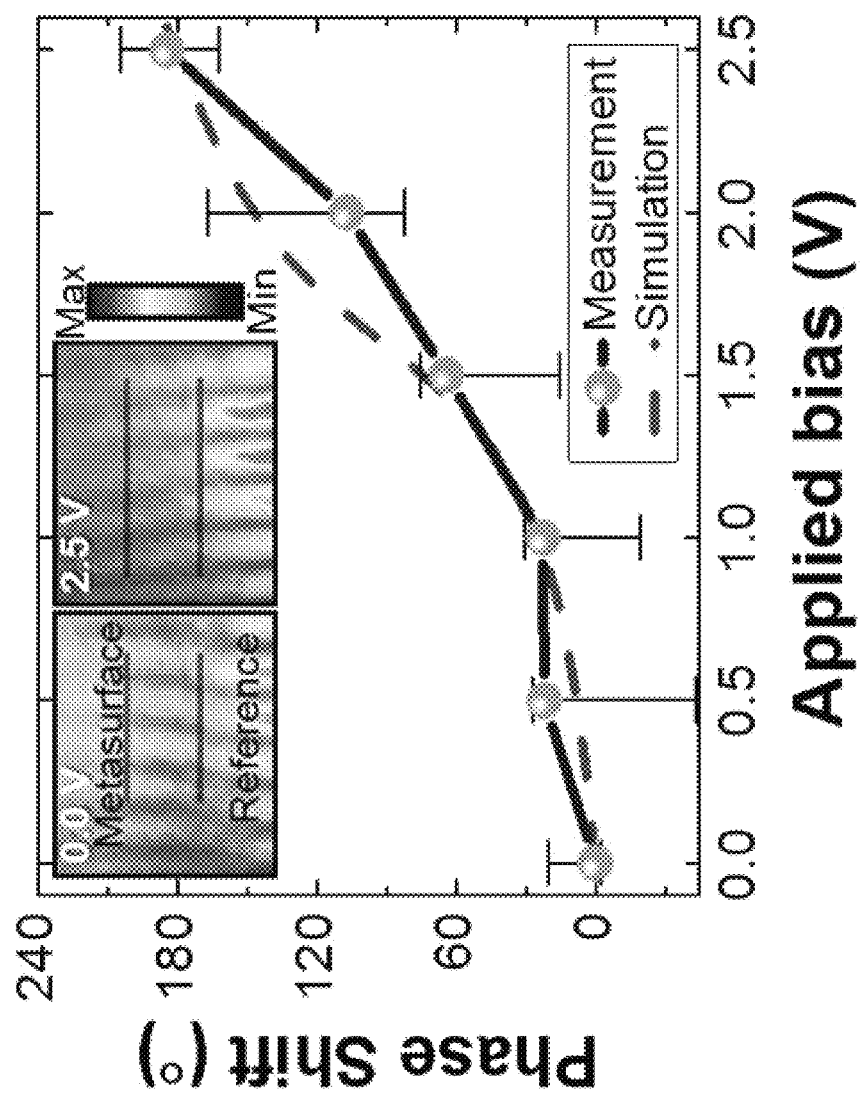

FIG. 3 illustrates an exemplary electrically tunable emitter unit cell according to the prior art. FIG. 3 illustrates a device with a back reflector (335) made out of a Au mirror; an ITO layer (330); a top gate dielectric (310) of $Al_2O_3$; a Au antenna (325); incident electromagnetic wave (315); and reflected electromagnetic wave (320). A voltage bias (305) can be applied between the Au mirror and the Au antenna. Measurements of the device in FIG. 3 are illustrated in FIG. 4: the device has 184 degree phase shift under an applied bias of 2.5 V. The measured reflectance is 20%. The device of FIG. 3 may have some disadvantages: the low dielectric constant of alumina; breakdown of the dielectric at electric fields of 5 MV/cm; the high work function of Au depletes the ITO layer at zero applied electrical bias. This type of device is discussed in Ref. [1]. FIGS. 3-4 are reproduced from Ref. [1].

Figure 5:
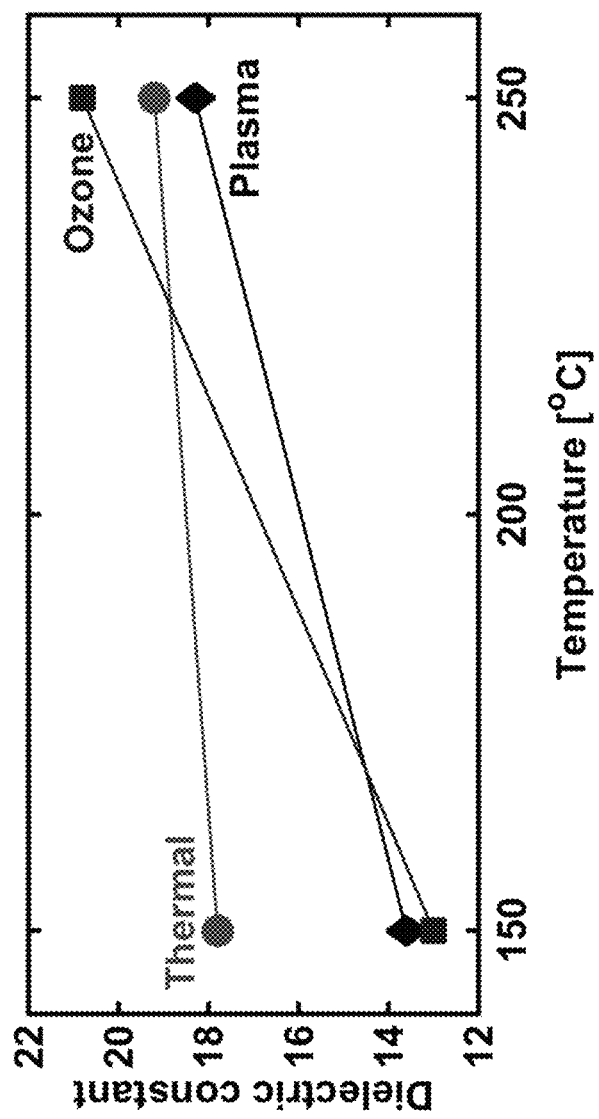
FIG. 5 illustrates exemplary parameters for the deposition of $HfO_2$ via atomic layer deposition.

In some embodiments, hafnium dioxide ($HfO_2$) can be used as a gate dielectric for the devices of the present disclosure. The use of hafnium dioxide as a gate dielectric is discussed in Ref. [2]. There are different methods of depositing $HfO_2$ via atomic layer deposition (ALD). Some exemplary parameters for the deposition of $HfO_2$ via atomic layer deposition are illustrated in FIG. 5. As illustrated in FIG. 5, an increase in the deposition temperature increases the dielectric constant of hafnium dioxide, but decreases the breakdown field.

In some embodiments, the gate dielectric of the devices of the present disclosure may comprise HAOL, a $HfO_2/Al_2O_3$ nanolaminate which comprises alternating layer of $HfO_2$ and $Al_2O_3$, the layers having a thickness in the nanometer range. For example, the nanolaminate may comprise alternating layers of two oxides, with layers of the one oxide having a first same thickness, and layers of the other oxide having a second same thickness. For example, HAOL can be deposited using a $HfO_2/Al_2O_3$ combinations. In some embodiments, the nanolaminate is deposited with 10 cycles of $Al_2O_3$ and 30 cycles of $HfO_2$ deposited by ALD. In some embodiments, the nanolaminate is immediately treated by rapid thermal annealing (RTA) at 800° C. for 30 seconds.

Rapid thermal annealing is a form of rapid thermal processing. Rapid thermal processing refers to a semiconductor manufacturing process which heats silicon wafers to high temperatures (over 1000° C.) on a timescale of several seconds or less. During cooling, wafer temperatures are brought down slowly to prevent dislocations and wafer breakage due to thermal shock. Such rapid heating rates are often attained by high intensity lamps or lasers. Rapid thermal annealing is a process used in semiconductor device fabrication which consists of heating a single wafer at a time in order to affect its electrical properties. Unique heat treatments can be designed for different effects. Wafers can be heated in order to activate dopants, change film-to-film or film-to-wafer substrate interfaces, densify deposited films, change states of grown films, repair damage from ion implantation, move dopants or drive dopants from one film into another or from a film into the wafer substrate.

Figure 6:
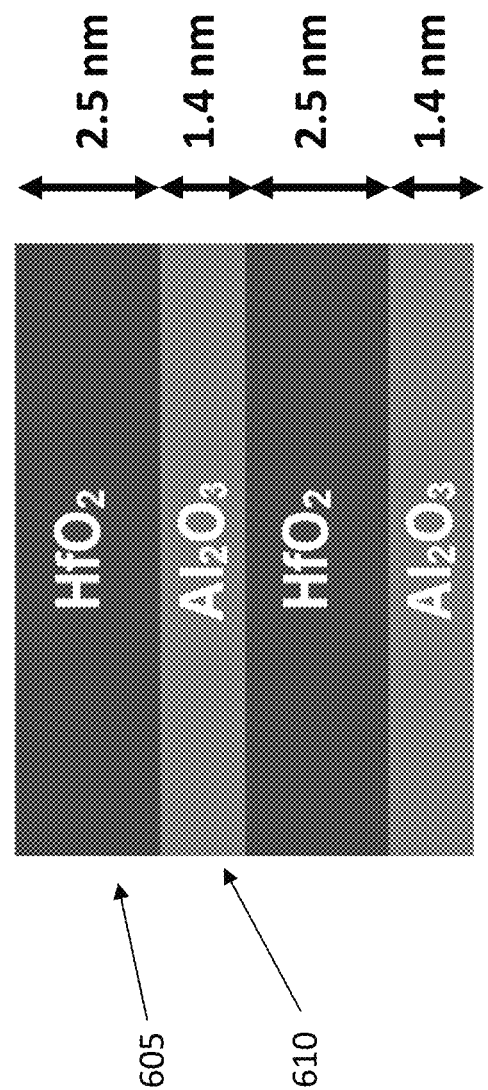
FIG. 6 illustrates an exemplary nanolaminate gate dielectric.

FIG. 6 illustrates an exemplary nanolaminate with alternating layers of hafnium dioxide (605) having a 2.5 nm thickness, and alumina (610) having a 1.4 nm thickness. In other embodiments, the hafnium dioxide layer may be, for example, between 2 and 3 nm, while the alumina layer may be, for example, between 1 and 2 nm.

Figure 7:
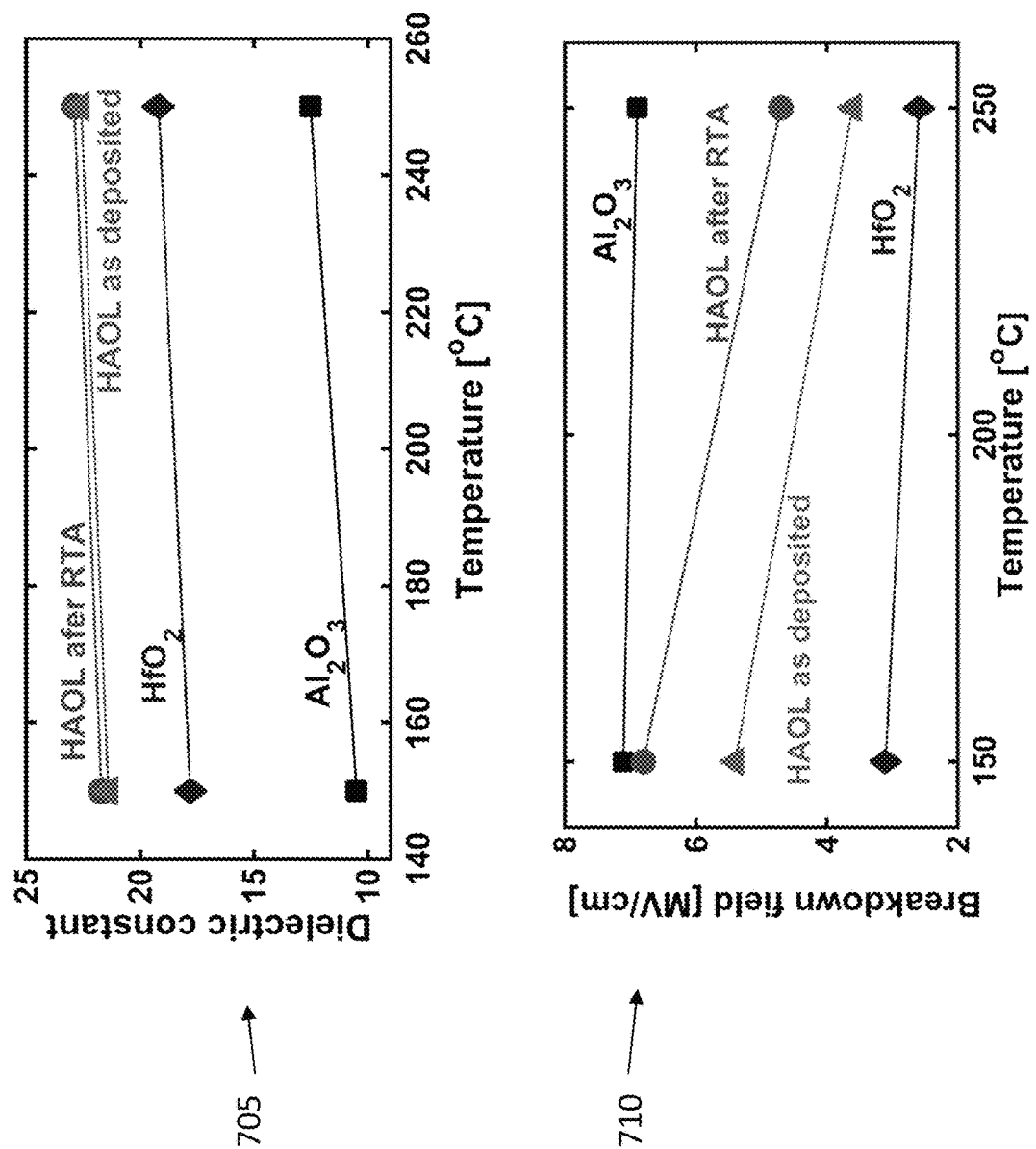
FIG. 7 illustrates measurement results of HAOL nanolaminates.

FIG. 7 illustrates measurement results of HAOL nanolaminates, for the dielectric constant (705) and breakdown field (710) of nanolaminates fabricated with different methods. According to the measurements of FIG. 7, HAOL can be fabricated with a dielectric constant of $\varepsilon_{dc}=22$ and a breakdown field of 7 MV/cm.

Figure 8:
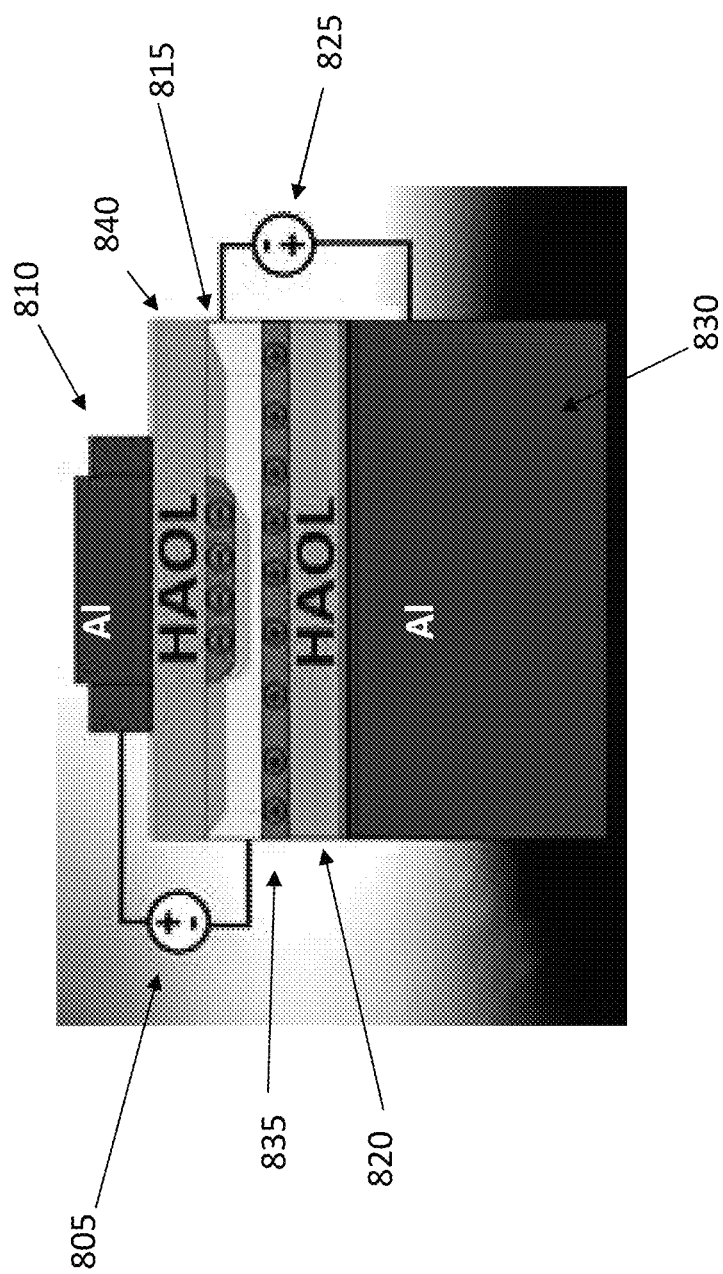
FIG. 8 illustrates an exemplary device with HAOL gate dielectrics.
Figure 9:
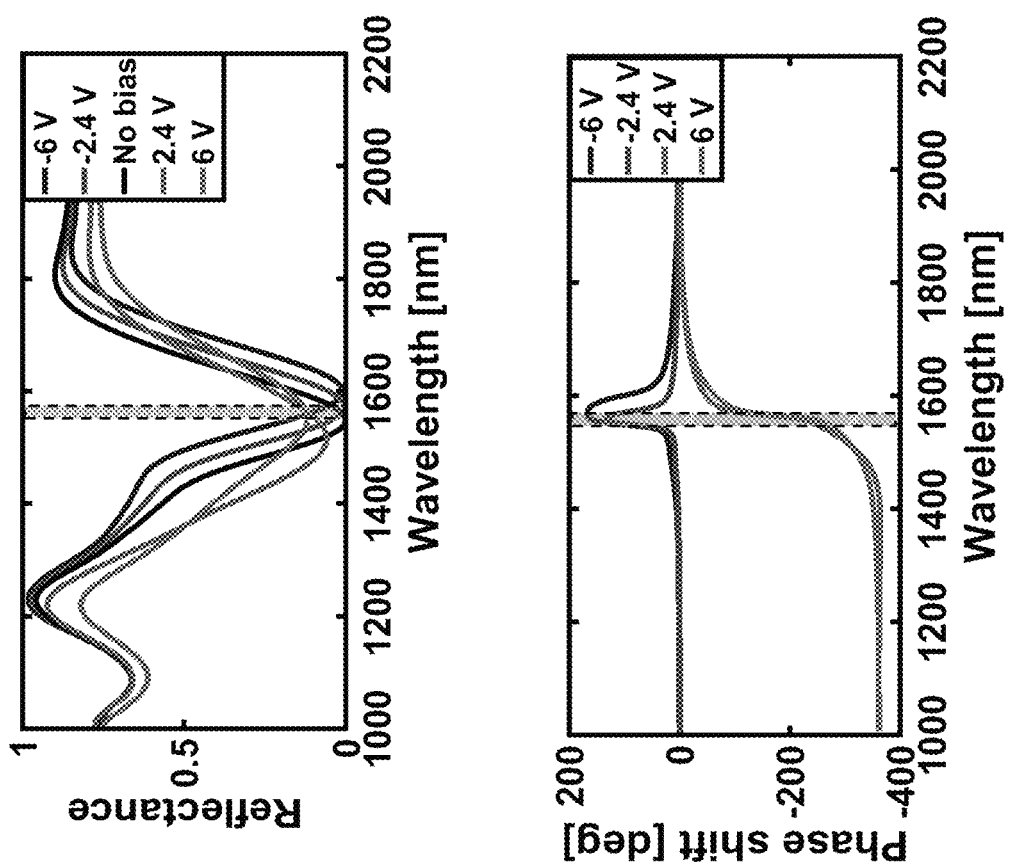
FIGS. 9-10 illustrate field-effect modulation of amplitude and phase of the reflected beam of the device of FIG. 8.
Figure 10:
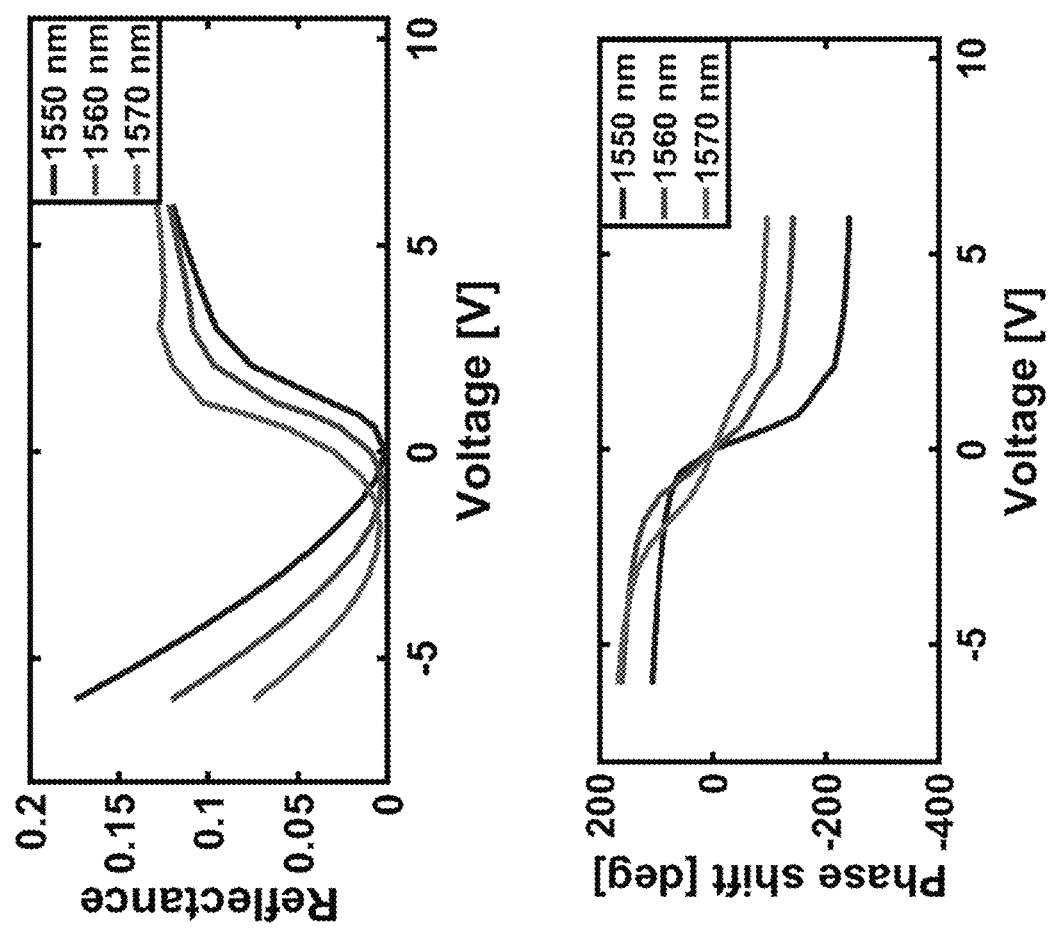

FIG. 8 illustrates an exemplary device with HAOL gate dielectrics. In FIG. 8, the unit cell device comprises an Al back reflector (830); a first HAOL nanolaminate (820), a transparent oxide such as ITO (815); a second HAOL nanolaminate (840) and an antenna (810). For example the antenna may have a shape like a cross, as in FIG. 1, but other shapes may also be used. A first voltage bias (805) can be applied between the antenna and the transparent oxide layer, while a second voltage bias (825) can be applied between the back reflector and the conductive oxide layer. FIGS. 9-10 illustrate field-effect modulation of amplitude and phase of the reflected beam of the device of FIG. 8. Simulations suggest that, in some embodiments, a maximum phase shift of 348° is attainable in near-infrared using double-gated structures. Therefore, double gated structures as illustrated in FIG. 8 present advantages compared to the single gated structures as illustrated in FIG. 3.

FIG. 9 illustrates reflectance and phase shift as a function of operating wavelength for different applied biases. FIG. 10 illustrates reflectance and phase shift as a function of applied voltage for different operating wavelengths.

The index change materials of the present disclosure can also be termed "electro-optical materials" as their optical properties, or refractive index, can be controlled through electrical means. Such materials can be realized by using transparent conducting oxides such as indium tin oxide and indium zinc oxide (IZO). These oxides are degenerately doped semiconductors which can be used to fabricate transparent electrodes. For example, ITO is compatible with semiconductor fabrication methods and possesses carrier-induced phase changes. Applying an electrical bias across an ITO layer can generate changes in the complex refractive index of an ultrathin charge accumulation layer at the interface of ITO with an insulating material such as a gate dielectric, as described in the present disclosure.

Similar electro-optical effects can be realized also in highly doped semiconductors such as Si. In some embodiments, the real part of the permittivity of a transparent conductive oxide such as ITO can change its sign from positive to negative by applying an increasing electrical bias, for example in the near infrared range.

As understood by the person of ordinary skill in the art, the devices of the present disclosure may comprise a first electric conductor connecting the transparent index-change layer and the antenna, the first electric conductor configured to apply a first voltage bias between the transparent index-change layer and the antenna; and a second electric conductor connecting the transparent index-change layer and the back reflector, the second electric conductor configured to apply a second voltage bias between the transparent index-change layer and the back reflector, thereby forming charge depletion or accumulation regions between the transparent index-change layer and the first or second gate dielectrics, in turn electrically tuning the refractive index of the index-change material by the application of the first and second voltage biases. In some embodiments additional conductors may be applied to fabricate a multigate structure, that is a structure with two or more, or three or more gates. An array of individually addressable unit cells can also be fabricated. Alternatively, all unit cells, or a group of the array, may be controlled by the same voltage biases.

The first and second conductors may comprise conductive paths connecting the layers across which the voltage bias will be applied. The conductors may also comprise means to apply a voltage bias, such as a voltage generator or power supply. The voltage generator or power supply may be part of the device, or may be external to device. If the power supply is external to the device, the conductor will provide appropriate electrical connections so that the required voltage bias can be applied to the appropriate layers as described in the present disclosure.

As known to the person of ordinary skill in the art, active metasurfaces composed of electronically reconfigurable nanoscale subwavelength antenna arrays can enable real-time control of scattered light amplitude and phase. Achievement of widely tunable phase and amplitude in chip-based active metasurfaces operating at or near 1550 nm wavelength have considerable potential for active beam steering, dynamic hologram rendition, and realization of flat optics with reconfigurable focal lengths. Electronically tunable conducting oxide-based reflectarray metasurfaces have demonstrated dynamic phase control of reflected light with a maximum phase shift of 184° (*Nano Lett.* 2016, 16, 5319, incorporated herein by reference in its entirety). The present disclosure describes a dual-gated reflectarray metasurface architecture that enables much wider (>300°) phase tenability compared to structures known in the art. The present disclosure describes the light-matter interactions with dual-gated metasurface elements that incorporate two or more independent voltage-controlled MOS field effect channels connected in series to form a single metasurface element that enables wider phase tunability. In some embodiments, for example using indium tin oxide (ITO) as the active metasurface material and a composite hafnia/alumina gate dielectric, a dual-gated metasurface can be fabricated having a continuous phase shift from 0 to 303°, and a relative reflectance modulation of 89% under an applied voltage bias of 6.5 V. Other voltage bias values may also be applied, depending on the application.

The ability to actively control all the important constitutive properties of light (wavelength, amplitude, phase, polarization state) via interaction with tunable nanoscale elements is an important issue in nanophotonics. Metasurfaces are two-dimensional nanostructured surfaces that enable versatile wavefront control for scattered light. Metasurfaces can also be viewed as arrays of subwavelength antennas such that each antenna imposes a pre-defined phase shift, amplitude change, and polarization rotation on the scattered light. The control offered by metasurfaces over the properties of reflected or transmitted light has given rise to the field of flat optics, which is exploring how metasurfaces can be used for creation of low-profile optical components. Metasurfaces can be used to realize focusing mirrors, focusing lenses, holograms, and polarization converters, for example. However, such metasurfaces known in the art are passive, which means their properties are fixed at the time of the fabrication, and they do not allow for post-fabrication tunability, contrary to the metasurfaces of the present disclosure. The ability to actively and dynamically tune the properties of metasurfaces would enable dynamic holograms, focusing lenses with reconfigurable focal length, and beam steering, an advantageous application for future chip-based light detection and ranging (LIDAR) systems.

A number of methods are possible to actively control the optical response of metasurfaces in the mid-infrared, near-infrared, and visible wavelength ranges. The target operational wavelength of a metasurface usually dictates the appropriate material platform and tuning mechanism to realize actively tunable metasurfaces. In the mid-infrared wavelength range, carrier density modulation via gating of graphene, GaAs or indium tin oxide (ITO), has been employed in nanophotonics as a mechanism to modulate metasurface reflectance. Also, thermo-optic tuning of PbTe antennas has yielded actively tunable structures in this wavelength range. A continuous phase shift from 0 to 230° by graphene gating under applied bias at a wavelength of 8.5 μm has also been achieved in this field. In the near-infrared and visible wavelength range, researchers have employed a number of different physical mechanisms to realize active metasurfaces. For example, metasurfaces with integrated liquid crystal active layers have enabled control of light transmittance by applying a direct current (DC) bias or by heating the liquid crystal. The reflectance and transmittance of a metasurface can also be mechanically modulated using electrostatic and magnetic forces. While the current knowledge in the art indicates options for active control of scattered light intensity, phase modulation of scattered light upon external actuation is of increasing importance, for example for beam steering applications.

Beam steering has been demonstrated with chip-based silicon photonics phased arrays operating at a wavelength of λ=1550 nm. The phase of each antenna can be actively tuned by a waveguide-based thermo-optic phase shifter through an integrated heater on the silicon chip. This approach enables the continuous tuning of the phase of the emitted light from 0 to 360° upon application of external bias. However, the large pixel size of the phased array (9 μm×9 μm) can result in undesired side lobes. Moreover, thermo-optic control can limit the modulation frequency of these phased arrays to less than 50 kHz, which can be too slow for versatile beam steering in LIDAR applications, and the thermal crosstalk between phase shifters and the photodetectors can limit the detection range to 20°.

Metasurfaces offer a different approach to the fabrication of phased array, in which the subwavelength antenna dimensions and subwavelength antenna spacing can suppress side lobes. Hence, it would be desirable to have a tunable metasurface platform for comprehensive and active control of scattered light in the near-infrared spectral range. Field-effect modulation of the carrier density and refractive index of heavily doped semiconductors can be used as an approach to fabricate actively tunable near-infrared metasurfaces. This approach relies on the field effect-induced charge accumulation or depletion in the semiconducting electrode of a nanoscale metal-oxide-semiconductor (MOS) structure that also serves as a resonant antenna. For example, using ITO as a semiconducting layer of the MOS field effect structure enables active modulation of the optical response of plasmonic reflectarray metasurfaces, with a corresponding reflected light phase shift from 0 to 184° for an applied bias between 0 to 2.5 V. While conceptually promising as an approach to active metasurface design, in order to realize a comprehensively tunable metasurface, a phase shift from 0° approaching to 360° can be desirable.

Figure 11:
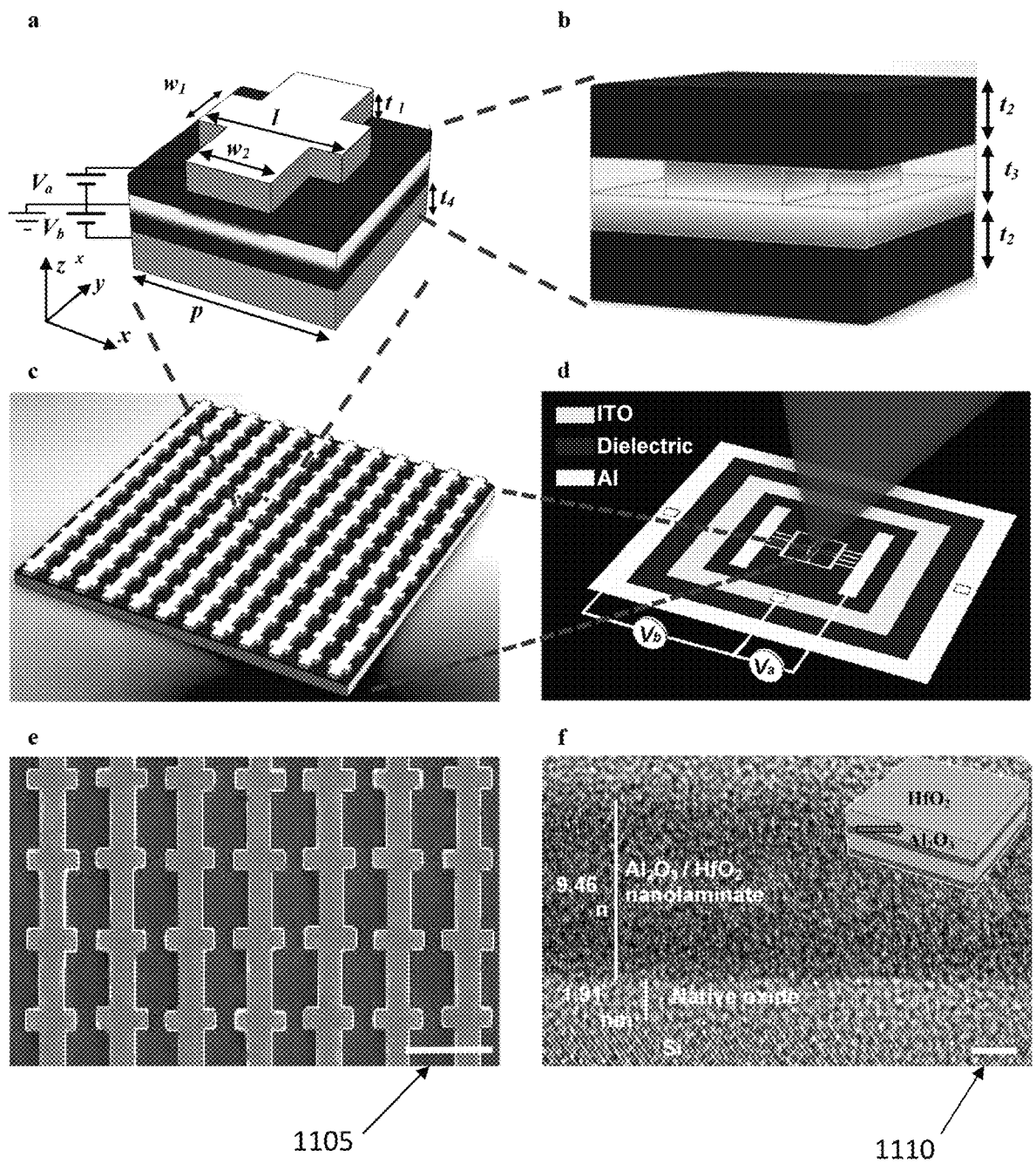
FIG. 11 panel a illustrates a schematic of the unit cell of the dual-gated metasurface.

The present disclosure describes the design and fabrication of dual-gated field-effect-tunable metasurface antenna arrays that enable phase shifts exceeding 300° at a wavelength of $\lambda=1550$ nm, although the devices described herein can also operate at other wavelengths. In some embodiments, the dual-gated metasurface described herein features two charge accumulation/depletion layers within the dielectric spacer of each active metasurface antenna (FIG. 11 panel a). In some embodiments, the dual-gated metasurface structure comprises an Al back reflector, a gate-dielectric/ITO/gate-dielectric heterostructure, and a periodic array of Al nanoantennas, for example with a 'fishbone' pattern, where the antenna has a longitudinal axis and a shorter elongation axis perpendicular to the longitudinal axis, with parallelepipeds extending along both axis (FIG. 11 panels a, b). A scanning electron microscope (SEM) image of the antenna array is shown in FIG. 11 panel c. In this embodiment, each metasurface element permits application of two independent DC voltages, i) between the ITO layer and the fishbone antenna, and ii) between the ITO layer and the back reflector. As a result, both the top and bottom ITO/gate-dielectric interfaces can exhibit charge accumulation or depletion layers under applied external bias. This design facilitates a large variation of the complex refractive index of the ITO layer via carrier density modulation at both its top and bottom interfaces (FIG. 11 panel b), and is a reason for the wide phase tunability of the dual-gated metasurface described herein.

In designing dual-gated metasurfaces, a number of important considerations can be taken into account, to increase the metasurface tunability and efficiency. For example, the ITO carrier concentration can be chosen to be $N_0=3\times10^{20}$ cm$^{-3}$ to ensure that the real part of the dielectric permittivity of the ITO layer is positive at a wavelength of $\lambda=1550$ nm, when no external bias is applied. Under bias, a charge accumulation layer is formed in the ITO, and the real part of the dielectric permittivity of the accumulation layer can change its sign, undergoing the transition from the optically dielectric to optically metallic phase. When the dielectric permittivity of the accumulation layer is in the epsilon-near-zero (ENZ) region, which means $-1<\text{Re}(\varepsilon)<1$, the optical electric field intensity in the accumulation layer is strongly enhanced, resulting in the modulation of the intensity and phase of the scattered light. The optical electric field enhancement in the ENZ region of ITO arises from the continuity of the normal component of the electric displacement as the index approaches zero in this region. This suggests that increasing the number of the accumulation/depletion layers within the active region of the metasurface antenna is beneficial for enhancing the tunability. On the other hand, since the optical loss of the ITO layer can be non-negligible, the ITO layer can be designed, in some embodiments, to be as thin as possible to ensure higher reflectance. Based on these considerations, the ITO layer thickness is, in some embodiments, about 5 nm in a dual-gated metasurface. This thickness value can also be used for multi-gated metasurfaces.

Another parameter that determines the performance of the electrically tunable metasurface is the choice of the plasmonic metal. The work functions of Al and Ag, which are both near 4.3 eV, are quite close to the work function of ITO when the carrier concentration equals $N_0=3\times10^{20}$ cm$^{-3}$, while the work function of Au (5.1 eV) is significantly higher than that of the ITO. Hence, in some embodiments, using Al or Ag as a metal electrode in the metal/gate-dielectric/ITO capacitor reduces the zero-bias band bending in the ITO layer compared to a Au electrode. This implies that in the case of Al or Ag electrodes it is possible to apply lower bias voltages to overcome the depletion and form an accumulation layer in the ITO at the gate-dielectric/ITO interface. Previous research has indicated that Ag can also migrate into the gate dielectric layers under applied electrical bias. To eliminate this possible issue, Al, a CMOS-compatible material, can be used, in some embodiments, as the plasmonic metal in our tunable metasurfaces.

FIG. 11 panel a illustrates a schematic of the unit cell of the dual-gated metasurface, which can comprise an Al back reflector, a 9.5 nm-thick bottom gate dielectric, a 5 nm-thick ITO layer followed by another 9.5 nm-thick gate dielectric on top of which 40 nm-thick Al fishbone antennas are located. The antenna dimensions, in some embodiments, are $l=280$ nm and $w_1=120$ nm, and the electrode width is $w_2=170$ nm. The period of the metasurface is $p=400$ nm. A voltage bias $V_a$ is applied between the ITO layer and the top antennas, while another voltage bias $V_b$ is applied between the Al back reflector and the ITO layer. The two applied voltage biases result in the formation of two accumulation/depletion regions in the ITO layer at the top and bottom ITO/gate-dielectric interfaces. FIG. 11 panel b illustrates a magnified image of the dielectric spacer of the metasurface that consists of the top gate dielectric, the ITO layer, and the bottom gate dielectric. FIG. 11 panel c illustrates a schematic of a metasurface. FIG. 11 panel d illustrates a schematic showing an exemplary bias application configuration. The nanoantenna array is electrically connected to an external pad to which the voltage bias is applied. FIG. 11 panel e illustrates a scanning electron microscopy image of a metasurface. The scale bar (1105) is 500 nm. FIG. 11 panel f illustrates a transmission electron microscopy image of an $Al_2O_3/HfO_2$ nanolaminate, which serves as a gate dielectric in a metasurface. The scale bar (1110) is 2 nm. The $Al_2O_3/HfO_2$ nanolaminate can be deposited via atomic layer deposition (ALD). An exemplary ALD fabrication process consists of two growth periods each including 10 cycles of $Al_2O_3$ and 30 cycles of $HfO_2$, followed by a 30-second-long rapid temperature annealing treatment at 600° C.

The attainable optical modulation in a tunable metasurface can be determined by the choice of the gate dielectric material. To have the strongest possible variation of the carrier density in ITO under applied voltage, it can be advantageous to use a gate dielectric with high DC permittivity and high breakdown field. $Al_2O_3$ and $HfO_2$ are among the most commonly used high dielectric constant gate dielectric materials, employed in field-effect transistor technology. $Al_2O_3$ exhibits good thermal stability and almost perfect interfacial properties with Si-based substrates, has a large bandgap, and a high breakdown field of up to 1 V/nm. However, it can suffer from a relatively low DC permittivity of $k_{Al_2O_3}$=9. On the other hand, $HfO_2$ is a CMOS compatible material with a wide bandgap, and relatively high dielectric constant of up to $k_{HfO_2}$=25, but it can exhibit a small breakdown field of 3.1 MV/cm, and high leakage current induced by its low crystallization temperature. $Al_2O_3/HfO_2$ nanolaminates, referred to as 'HAOL' materials, may have superior electrostatic characteristics as compared to both $Al_2O_3$ and $HfO_2$. HAOL structures, which are fabricated via consecutive deposition of ultrathin $Al_2O_3$ and $HfO_2$ layers, can have the low leakage current and high breakdown field characteristics of $Al_2O_3$, and also the large DC permittivity characteristic of $HfO_2$. During the fabrication process of exemplary metasurfaces of the present disclosure, thin HAOL films were deposited by using atomic layer deposition (ALD). Their properties were compared with separately grown $Al_2O_3$ and $HfO_2$ films. Transmission electron microscopy (TEM), as well as capacitance-voltage (C-V) and current-voltage (I-V) measurements were used to characterize the deposited films. It was found that the DC permittivities of $Al_2O_3$, $HfO_2$, and HAOL films were, in these examples, equal to $k_{Al_2O_3}$=10.5, $k_{HfO_2}$=17.8, and $k_{HAOL}$=22, respectively. Furthermore, the measured breakdown fields of the fabricated $Al_2O_3$, $HfO_2$, and HAOL films were $E_{Al_2O_3}$=7.4 MV/cm, $E_{HfO_2}$=3.1 MV/cm, and $E_{HAOL}$=7.2 MV/cm, respectively. Since HAOL structures can show superior electrostatic performance as compared to the $Al_2O_3$ and $HfO_2$ films, HAOL structures as the gate dielectric in dual-gated metasurfaces.

After identifying the optimal constituent materials, dual-gated tunable metasurfaces were fabricated. In a first step, an 80 nm-thick Al back reflector was deposited on a 100 Si wafer by electron beam evaporation. Next, a 9.5 nm-thick $Al_2O_3/HfO_2$ nanolaminate was deposited on the back reflector via ALD, and a 5 nm-thick layer of ITO was sputtered on the nanolaminate. The the ITO carrier concentration was $N_0$=3×10$^{20}$ cm$^{-3}$. To characterize the ITO films, Hall measurements and spectroscopic ellipsometry were performed on 5 nm-thick ITO layers deposited on quartz and Si substrates, respectively. The top gate dielectric was deposited on the ITO layer, consisting of a 9.5 nm-thick HAOL layer. Finally, a 40 nm-thick Al fishbone antenna array was fabricated on top of the upper HAOL layer by electron beam evaporation of Al and patterning by electron beam lithography. The exemplary antenna width and length were $w_1$=120 nm and l=280 nm, and the width of the stripe electrode was $w_2$=170 nm (FIG. 11 panel a). During fabrication, the samples were patterned to allow for easy application of a bias between the Al back reflector and the ITO layer ($V_b$ in FIG. 11 panel d). The Al fishbone antennas were connected to an external Al pad that allows for a bias application between the fishbone antennas and the ITO layer ($V_a$ FIG. 11 panel d). The electrode pads were then wire bonded to a compact chip carrier and circuit board for electrical gating. FIG. 11 panel d shows a bias configuration for dual-gated metasurfaces.

The optical response of the metasurface was modeled under applied bias using finite difference time domain simulations coupled to device physics simulations. The device physics simulations are used to determine the charge carrier distribution in the ITO layer under applied bias. The calculated carrier density can be related to the complex dielectric permittivity of ITO $\varepsilon_{ITO}$ using a Drude model approach: $\varepsilon_{ITO}=\varepsilon_\infty-\omega_p^2/(\omega^2+i\omega\gamma)$, since the plasma frequency $\omega_p$ is proportional to the square root of the carrier density of ITO $N_{ITO}$. Here, $\gamma$ is the damping constant, $\varepsilon_\infty$ is a fitting constant; $\omega_p$, $\gamma$, and $\varepsilon_\infty$ at zero bias are determined empirically from Hall measurements and ellipsometry; $\omega$ is the angular frequency, which is related to the wavelength $\lambda$ as $\lambda=2\pi c/\omega$, where c is the speed of light in vacuum.

Figure 12:
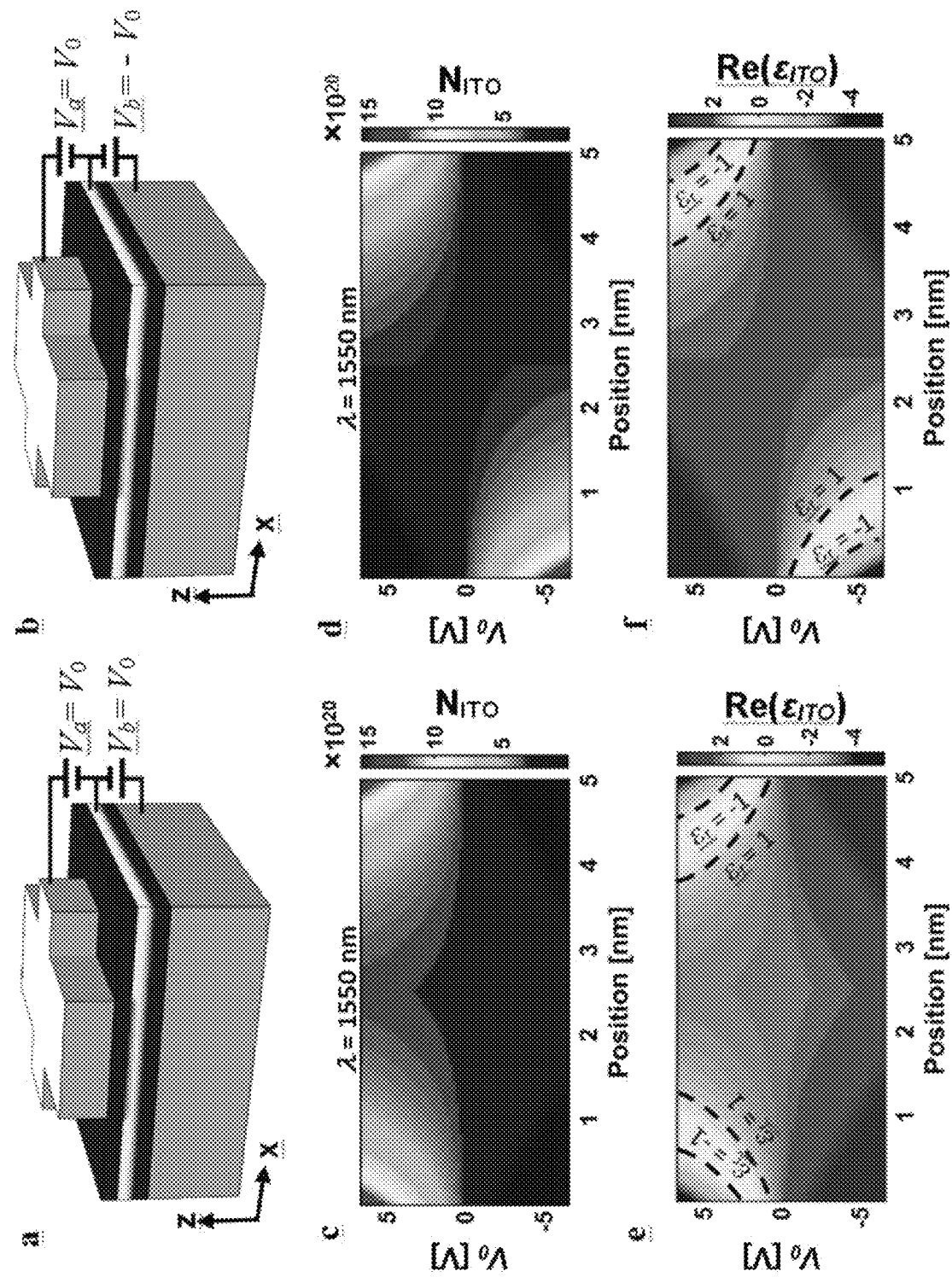
FIGS. 12-15 illustrates different properties of metasurfaces.

FIG. 12 illustrates a schematic of one embodiment referred to as "Case I", in panel 1, in which there is a simultaneous charge accumulation or simultaneous charge depletion at the both ITO/HAOL interfaces of the ITO layer. In Case I it is assumed that $V_a$=$V_0$ and $V_b$=$V_0$. FIG. 12 panel b illustrates one embodiment referred to as "Case II", in which the charge accumulation (depletion) at the top ITO/HAOL interface is always accompanied by the charge depletion (accumulation) at the bottom ITO/HAOL interface. In Case II it is assumed that $V_a$=$V_0$ and $V_b$=$-V_0$. The charge carrier distribution in the ITO layer as a function of applied voltage $V_0$ is illustrated in FIG. 12 panel c for Case I and in FIG. 12 panel d for Case II. The real part of the dielectric permittivity of the ITO layer as a function of the applied voltage and position for Case I is illustrated in FIG. 12 panel e and for Case II in FIG. 12 panel f at a wavelength of $\lambda$=1550 nm. The boundaries of the ENZ regions are marked by dashed curves.

Figure 13:
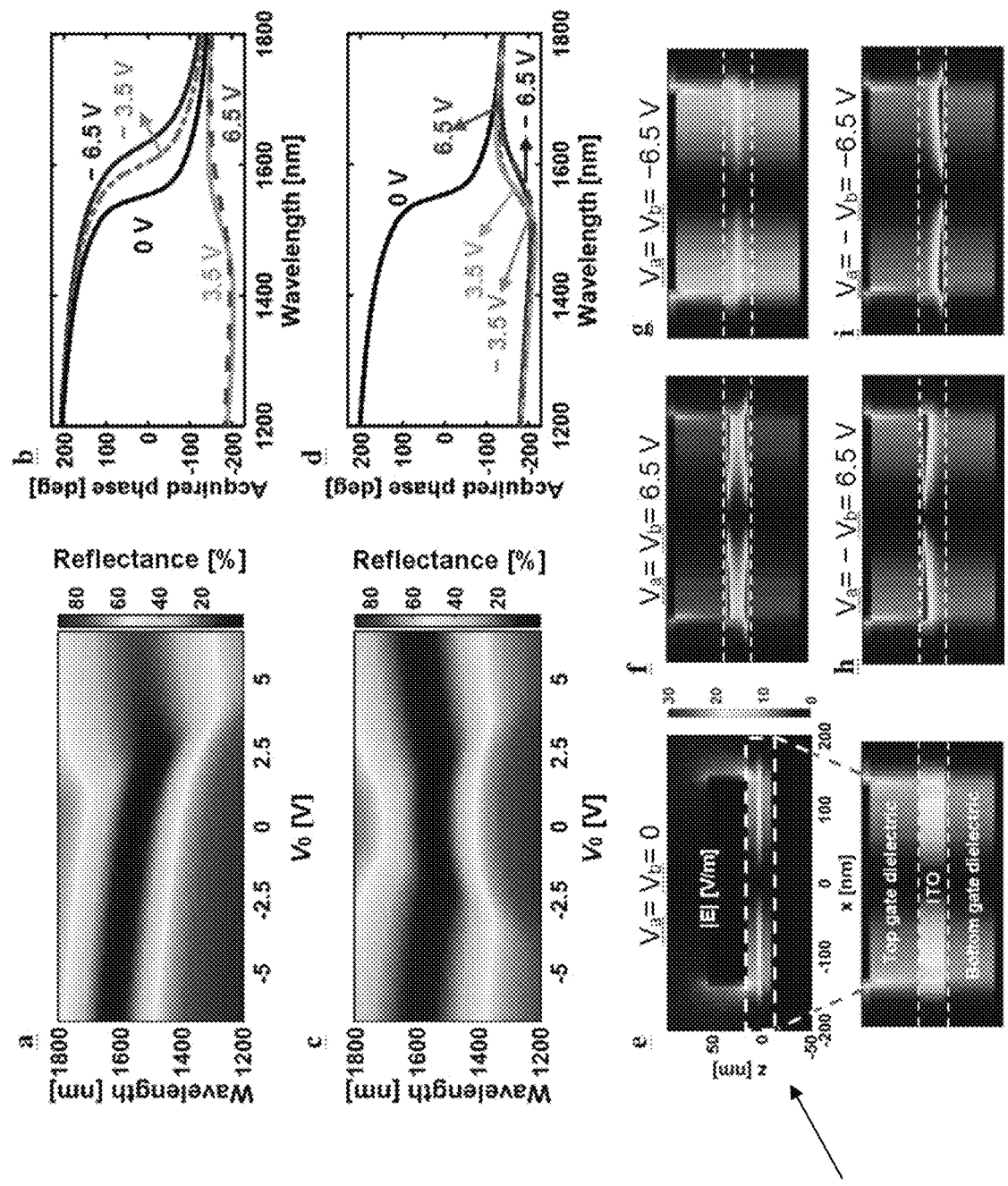

The electrostatic performance of a dual-gated tunable metasurface element can be understood as two parallel plate capacitor structures, which are connected in series. Therefore, two independent bias voltages can be applied to each metasurface element, $V_a$ and $V_b$ (FIG. 11 panel a). In the following discussion it can be assumed that $|V_a|=|V_b|$ that now yields two accessible regimes of device operation, where sign $(V_a \times V_b) \geq 0$ (Case I) and where sign $(V_a \times V_b) \leq 0$ (Case II). In other words, in Case I there is a simultaneous charge accumulation or simultaneous charge depletion at both ITO layer interfaces (FIG. 13 panels a, c, e). In Case II, charge accumulation at the top ITO/HAOL interface is accompanied by charge depletion at the bottom ITO/HAOL interface, or, vice versa, charge depletion at the top ITO/HAOL interface is accompanied by charge accumulation at the bottom ITO/HAOL interface (FIG. 12 panels b, d, f). The charge carrier distributions in the 5-nm thick ITO layer for Case I and Case II are depicted in FIG. 12 panels c and d, respectively. Here, the z position varies between 0 and 5 nm, with 0 corresponding to the bottom ITO/HAOL interface and 5 nm corresponding to the top ITO/HAOL interface.

It can be noted that only the portion of the ITO located directly beneath the Al fishbone antenna is optically modulated at the top ITO/HAOL interface (FIG. 12 panel b). As seen in FIG. 12 panel c, in Case I the ITO dielectric permittivity at the bottom ITO/HAOL interface is always equal to the dielectric permittivity of the ITO at the top ITO/HAOL interface beneath the fishbone antenna. This, however, is not true for Case II. In Case II, for sufficiently large applied voltage magnitude, there is always charge accumulation at either top or bottom interface of the ITO layer (FIG. 12 panel d). The person of ordinary skill in the art will understand that the simulation results are exemplary, and not intended to be limiting for the devices of the present disclosure.

After modeling the complex dielectric permittivity of ITO as a function of position and applied voltage, it is possible to calculate the metasurface optical response for different applied biases under normal incidence illumination with a transverse magnetic (TM) polarized plane wave (E-field along x-direction). FIG. 13 panel a shows the reflectance of a dual-gated metasurface in Case I as a function of wavelength and applied voltage. In this case, a large reflectance modulation and large phase shift (FIG. 13 panel b) are observed at positive biases, when the dielectric permittivity of both the top and bottom ITO interfaces crosses into the ENZ region. The phase shift is defined as a difference between the phases of the reflected and incoming plane waves calculated at the same spatial point. In Case I, it is possible to observe a blue shift of the resonance when the applied bias increases from 0 to 2.5 V. For applied voltages larger than 2.5 V, the resonance red shifts. In Case II it is possible to observe a significant reflectance and phase modulation both at positive and negative biases (FIG. 13 panels c-d). Moreover, it is possible to observe that in Case II the reflectance spectrum is invariant with respect to the transformation $V_0 \to -V_0$. This is due to the fact that in Case II both at positive and negative biases the gap plasmon resonance couples to the ENZ region in ITO that is formed in either the top or the bottom ITO layer interface.

To gain further insight, it is possible to plot the distribution of the absolute value of the optical electric field in the metasurface element for the resonant wavelength of $\lambda=1550$ nm (FIG. 13 panels e-i). FIG. 13 panel e shows the spatial distribution of the optical electric field at zero bias. The top part (1305) of FIG. 13 panel e shows the magnified region of the dielectric spacer at zero bias. When a DC bias is applied, it is possible to observe a significant variation of the distribution of the optical electric field. FIG. 13 panel f shows the optical electric field distribution in Case I at an applied voltage of $V_0=6.5$ V. As seen in FIG. 13 panel f, the optical electric field is enhanced at both the top and bottom ITO/HAOL interfaces due to the ENZ regions that are formed at these interfaces (FIG. 13 panel e). On the other hand, when the applied DC bias in Case I is equal to $V_0=-6.5$ V, the ITO layer is depleted at both top and bottom interfaces (FIG. 13 panels c-e), and therefore we do not observe a significant optical field enhancement in the ITO layer (FIG. 13 panel g). In Case II, however, a dramatic optical field enhancement is observed at both positive and negative applied biases $V_0=\pm6.5$ V (FIG. 13 panels h-i). In this case at an applied bias of $V_0=6.5$ V, it is possible to observe the optical electric field enhancement in the ITO layer around the top ITO/HAOL interface due to the ENZ region formed in the ITO layer (FIG. 13 panel h). Similarly, FIG. 13 panel i shows that in Case II, the optical electric field is enhanced around the bottom part of the ITO layer, when the applied bias is equal to $V_0=-6.5$ V. The analysis of the optical field profile suggests that strong light confinement in the dielectric gap of the plasmonic antenna significantly contributes to the observed optical modulation.

FIG. 13 panel a illustrates the reflectance from the metasurface as a function of wavelength and applied voltage in Case I. FIG. 13 panel b illustrates the phase spectrum of the reflected light for different applied voltages in Case I. FIG. 13 panel c illustrates the reflectance as a function of wavelength and applied bias in Case II. FIG. 13 panel d illustrates the phase shift spectrum for different applied voltages in Case II. FIG. 13 panel e illustrates the spatial distribution of the magnitude of the electric field inside the metasurface element at no applied bias. The top part (13050) of panel e shows the magnified image of the field distribution in the HAOL/ITO/HAOL dielectric spacer of the metasurface. The close-up of the distribution of the electric field magnitude in the dielectric spacer of the metasurface when $V_0=6.5$ V in Case I (FIG. 13 panel f), $V_0=-6.5$ V in Case I (FIG. 13 panel g), $V_0=6.5$ V in Case II (FIG. 13 panel h), $V_0=-6.5$ V in Case II (FIG. 13 panel i).

Figure 14:
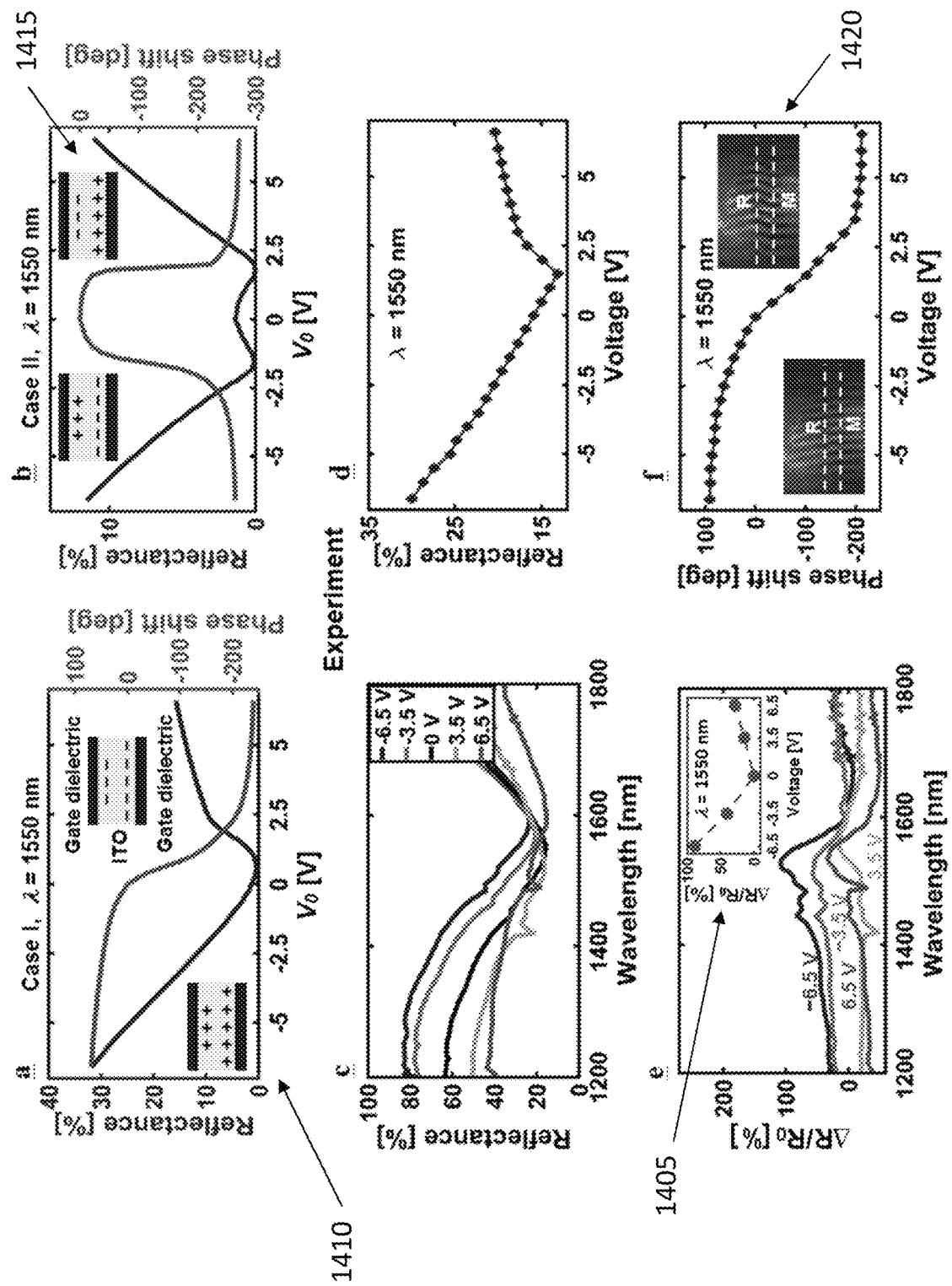

FIG. 13 panels b and d illustrate how dual-gated metasurfaces significantly alter the phase of the reflected light under an applied bias. FIG. 14 panels a-b illustrate the phase shift and reflectance as a function of applied bias $V_0$ at a wavelength of $\lambda=1550$ nm. FIG. 14 panel a, which corresponds to Case I, shows that this bias configuration gives a continuously tunable phase shift between 70° and −245°, when the applied voltage is varied between $V_0=-6.5$ V and $V_0=6.5$ V. This amounts to a total tunable phase shift of 315° derived from Case I. As expected, a phase shift derived from Case II is invariant with respect to the transformation $V_0 \to -V_0$ (FIG. 14 panel b). In Case II, the phase shift smoothly varies between 0 and −275°, when the applied voltage is increased from $V_0=0$ V to $V_0=6.5$ V. Thus, via an appropriate bias application, the dual-gated tunable metasurface can attain a tunable phase shift of 345°.

Having identified an approach to metasurface design, exemplary dual-gated metasurfaces were fabricated and characterized to measure the tunable optical response. Optical measurements were performed by illuminating the metasurfaces with linearly polarized light with incident electric field aligned with the patch antenna (x direction in FIG. 11 panel a). In these experiments, the bias configuration corresponds to Case I, when $V_a=V_0$ and $V_b=V_0$ (FIG. 13 panel a). FIG. 14 panel c displays the measured reflectance spectra at different values of applied voltage $V_0$. The resonance is observed to blue shift with increasing voltage from $V_0=0$ V to $V_0=2.5$ V. When the applied voltage was increased from $V_0=2.5$ V to $V_0=6.5$ V, the resonance was observed to red shift, and likewise when the applied bias was decreased from $V_0=0$ V to $V_0=-6.5$ V, a resonance red shift was observed. These observations are consistent with the simulation results (FIG. 13 panel a), which indicate that at an applied voltage of $V_0=2.5$ V, the ENZ region is reached in the ITO accumulation layer, corresponding to the transition from resonance blue shift to red shift. FIG. 14 panel d displays the reflectance as a function of applied voltage $V_0$ at a wavelength of $\lambda=1550$ nm. A decrease in reflectance can be observed when the applied voltage increases from $V_0=-6.5$ V to $V_0=0.6$ V. Once the applied bias has passed $V_0=0.6$ V, an increase in reflectance can be observed (FIG. 14 panel d). FIG. 14 panel e shows relative reflectance spectra $\Delta R/R_0 = [R(V_0)-R(0)]/R(0)$ at different applied voltage values $V_0$. Even though the measured reflectance modulation $\Delta R/R_0$ is fairly broadband, an enhancement in $\Delta R/R_0$ around the metasurface resonant wavelength can be observed. The inset (1405) of FIG. 14 panel e shows the relative reflectance modulation $\Delta R/R_0$ as a function of applied bias $V_0$ at a wavelength of $\lambda=1550$ nm. At a wavelength of $\lambda=1550$ nm, the relative reflectance modulation is much more significant for negative rather than positive bias voltages. When $V_0$ decreases from $V_0=0$ V to $V_0=-6.5$ V, a relative reflectance modulation of 89% can be observed at a wavelength of $\lambda=1550$ nm. On the other hand, when the applied voltage $V_0$ increases from $V_0=0$ V to $V_0=6.5$ V, the observed relative reflectance modulation is only 28% (see the inset 1405 of FIG. 14 panel e). This implies that at the resonance wavelength, the formation of multiple ITO charge depletion layers influences the reflectance more significantly than the formation of multiple charge accumulation layers. This change in reflectance can be explained by the modulation of the optical electric field in the ITO layer under applied bias. At $V_0=0$ V, the formation of the magnetic dipole leads to strong absorption in the ITO layer, whereas the applied bias effectively modulates the optical field distribution in the dielectric spacer of the metasurface and leads to higher reflectance. The person of ordinary skill in the art will understand that exemplary experimental results are intended to provide examples and not to limit the devices of the present disclosure.

After performing metasurface gate-tunable reflectance measurements and identifying the resonance wavelength, the reflected light phase shift can be measured under applied bias. For the phase shift measurements, a Michelson interferometer-type was employed. In the interferometer, laser light illuminated the edge of the metasurface. Therefore, a part of the incoming beam is reflected from the metasurface, while the other part is reflected from the surrounding planar Al/HAOL/ITO/HAOL heterostructure, which acts as a built-in phase reference. The images of the interference fringes formed were recorded by a CCD camera, and subsequently processed and fitted. The fitting procedure enables retrieval of the relative displacement of the interference fringes originating from the metasurface and the reference when a voltage bias is applied.

FIG. 14 panels a-b illustrate the simulated reflectance and phase shift of a metasurface as a function of voltage $V_0$. The wavelength in this example is fixed at $\lambda=1550$ nm. Panel a corresponds to Case I, in which there is a simultaneous charge accumulation or simultaneous charge depletion in the ITO layer at the both ITO/HAOL interfaces. Panel b corresponds to Case II, in which the charge accumulation at the top ITO/HAOL interface is always accompanied by the charge depletion at the bottom ITO/HAOL interface and vice versa. The insets of panels a and b (1410,1415) schematically show the charge distribution in the dielectric spacer of the metasurface. Panel c illustrates measured reflectance spectra in Case I at different applied voltages $V_0$. Panel d illustrates measured reflectance in Case I as a function of applied bias $V_0$. The wavelength is fixed at $\lambda=1550$ nm. Panel e illustrates the spectra of the relative reflectance modulation $\Delta R/R_0$ for different applied voltages $V_0$. The inset shows the relative reflectance change at a wavelength of $\lambda=1550$ nm as a function of applied bias $V_0$. Panel f illustrates measured phase shift of the metasurface as a function of applied voltage $V_0$ at a wavelength $\lambda=1550$ nm. The insets of panel f (1420) show the interference fringes at −6.5 V and +6.5 V. The dashed lines labeled as R and M indicate the interference fringes from the reference mirror and metasurface, respectively.

The measured interference fringe displacement was converted into a relative phase shift. The interferometry technique enabled accurate phase measurements, since in this configuration, errors caused by vibrations and other motion instabilities are eliminated. Examples of interference fringe images recorded at bias voltages of $V_0=-6.5$ V and $V_0=+6.5$ V are shown in the inset (1420) of panel f. In this measurement, the laser illumination wavelength is $\lambda=1550$ nm. The dashed white lines show the interference fringes from the metasurface (M) and the reference (R). FIG. 14 panel f shows the measured phase shift as a function of applied voltage $V_0$ ($\lambda=1550$ nm). When the applied voltage was increased from $V_0=0$ V to $V_0=+6.5$ V, a phase shift of −211.9° was observed, which is accompanied by a modest relative reflectance modulation of 28%. When the applied voltage was decreased from $V_0=0$ V to $V_0=-6.5$ V, a phase shift of +91° was observed, consistent with the simulation results shown in FIG. 14 panel a. Interestingly, despite the modest phase shift recorded at negative biases $V_0<0$, the reflectance measured at a wavelength $\lambda=1550$ nm increases from 13% to 30%. An overall phase shift of 303° was produced as the dual-gated metasurface applied bias was varied between $V_0=-6.5$ V and $V_0=+6.5$ V.

Therefore, a dual-gated plasmonic reflectarray metasurface shows wide phase tunability with applied bias at a wavelength of $\lambda=1550$ nm, and the reflected light phase can be continuously tuned from 0 to 303°. A relative reflectance modulation of 89% was measured. This large optical tunability is achieved both due to the materials employed here and to the dual-gated metasurface architecture, though in other embodiments multi-gated surfaces can also be used. Each antenna of the dual-gated metasurfaces can be viewed as two series-connected MOS field effect structures where two independent bias voltages can be applied, yielding a wider phase tuning range compared to a single-gated metasurface. A given phase shift can be achieved via multiple different bias configurations that yield different reflectance values, enabling an approach for reflectance modulation at constant phase. This feature may be very useful for design and demonstration of future dynamically reconfigurable low-profile optical components such as focusing lens with reconfigurable focal length, dynamic holograms, and beam steering devices.

To accurately calculate the optical response of metasurfaces under applied bias, the device physics simulations can be coupled with finite difference time domain optical simulations. The electrostatics calculations model the spatial distribution of charge in the ITO layer embedded in the metasurface. In the device physics calculations, it was assumed that the work function of Al is 4.3 eV. It was also assumed that the effective electron mass of ITO is m*=0.35 $m_e$, electron mobility of ITO is 25 cm²V⁻¹s⁻¹, where $m_e$ is the free electron mass. Since the ITO is degenerately doped, it can be assumed that holes do not significantly contribute to the observed physical processes. In the simulations, the effective mass of holes is 1×$m_e$, and the hole mobility is 1 cm²V⁻¹s⁻¹. In the simulations, the bandgap of ITO is set to 2.8 eV, and the electron affinity of ITO is chosen as 4.8 eV. The assumed DC permittivity of ITO is 9.3. Once the spatial distribution of charge under different applied biases is identified, the calculated carrier density can be related to the complex dielectric permittivity of ITO $\varepsilon_{ITO}$ by using the Drude model: $\varepsilon_{ITO}=\varepsilon_\infty-\omega_p^2/(\omega^2+i\omega\Gamma)$. The plasma frequency $\omega_p$ is given by the following expression $\omega_p = \sqrt{N_{ITO}e^2/(\varepsilon_0 m^*)}$. Here, $N_{ITO}$ is the carrier concentration of ITO, which can be extracted from the device physics calculations, e is the electron charge, $\varepsilon_0$ is the DC permittivity of vacuum, $\Gamma$ is the damping constant, $\varepsilon_\infty$ is a fitting constant, $\omega$ is the angular frequency, which is related to the wavelength $\lambda$ as $\lambda=2\pi c/\omega$, where c is the speed of light in vacuum. When performing optical simulations, it can be assumed that m*=0.35 $m_e$, $\gamma=1.8\times10^{14}$, and $\varepsilon_\infty=3.9$.

Figure 15:
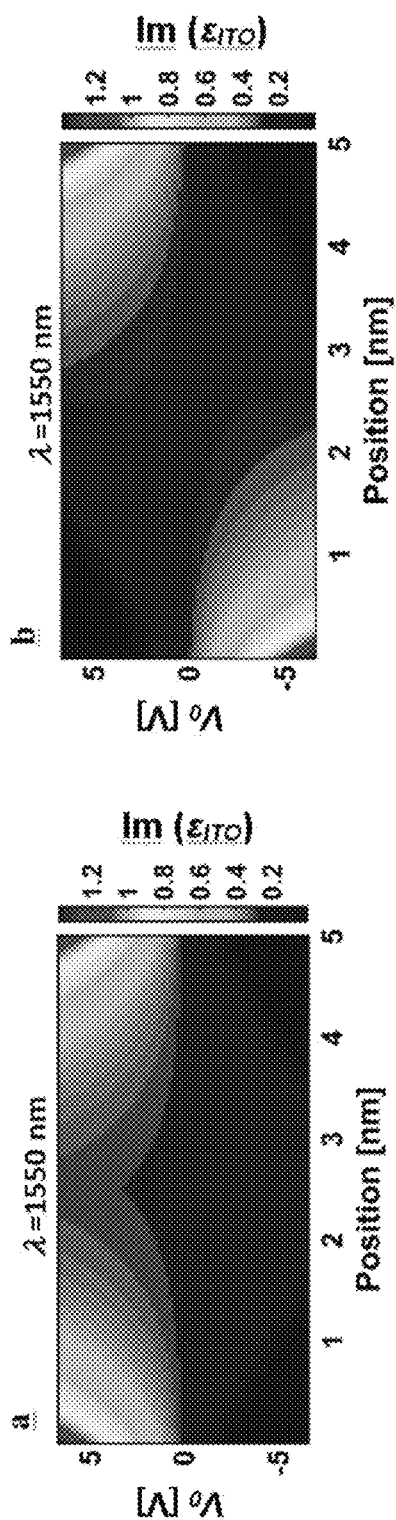

FIG. 15 illustrates the calculated imaginary part of dielectric permittivity of a 5-nm thick ITO film embedded in a dual-gated metasurface as a function of position and applied bias. Panel a refers to Case I and panel b refers to Case II. In FIG. 15, 0 nm corresponds to ITO/bottom-HAOL interface, and 5 nm corresponds to ITO/top-HAOL interface.

Nanolaminate $HfO_2$-$Al_2O_3$ films can be fabricated by using atomic layer deposition (ALD). The deposition can be performed, for example, at 150° C. Tetrakis (ethylmethylamino) hafnium, $[(CH_3)(C_2H_5)N]_4Hf$, can be used as a precursor for Hf, while trimethyl aluminum, $Al(CH_3)_3$, can be used as a precursor for Al. During the ALD process, water can be used as an oxidant. To fabricate HAOL, two growth periods can be used, with each period consisting of 10 cycles of $Al_2O_3$ and 30 cycles of $HfO_2$. Immediately after the deposition, rapid thermal annealing (RTA) in nitrogen atmosphere can be performed. The RTA is performed for 30 s at a temperature of 600° C. Previous research has shown that the RTA treatment causes the diffusion of Al atoms (from $Al_2O_3$ layer) into $HfO_2$, resulting in formation of Al—Hf—O bonds.

Figure 16:
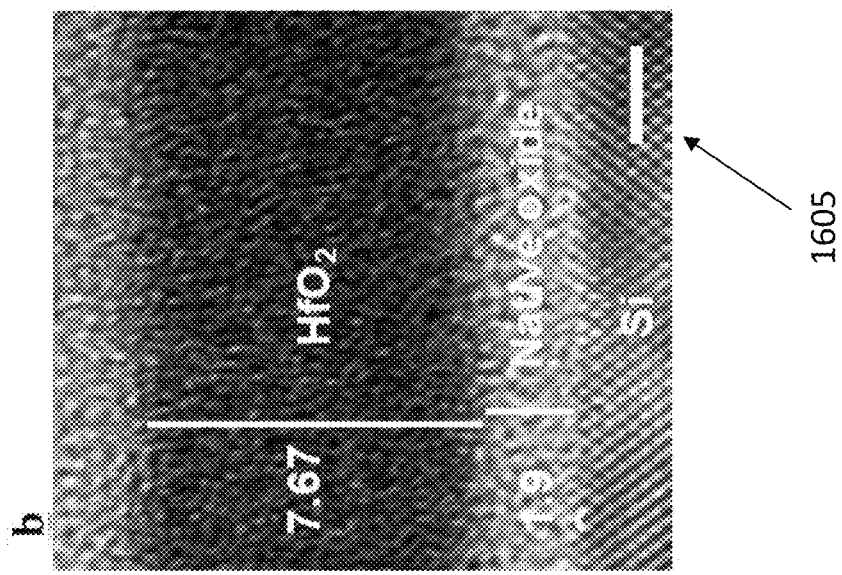
FIG. 16 illustrates scanning electron microscope (SEM) images of metasurfaces.
Figure 16:
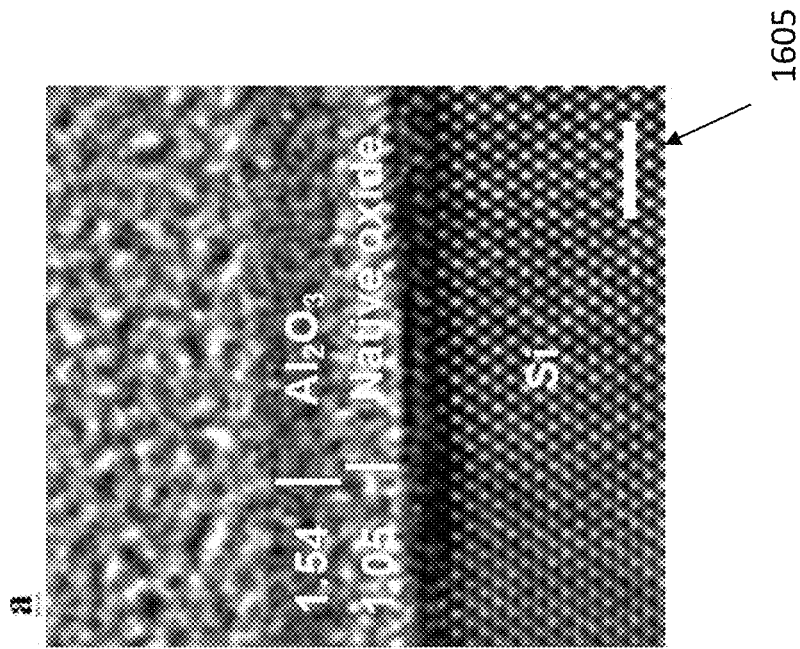

To determine the growth per cycle rates of $Al_2O_3$ and $HfO_2$ films, the $Al_2O_3$ and $HfO_2$ control samples can be fabricated on Si substrates. For $Al_2O_3$ 2×10 cycles can be used, while 2×30 cycles can be used to deposit $HfO_2$. Transmission electron microscopy (TEM) can be used to identify the thicknesses of the grown samples. The thicknesses of the fabricated exemplary $Al_2O_3$, $HfO_2$, and HAOL films are 1.54 nm, 7.67 nm, and 9.46 nm, respectively (FIG. 16). As shown in FIGS. 16 and 12, the $Al_2O_3$ layers remain amorphous, while the $HfO_2$ layers are partially crystallized after RTA treatment, in some embodiments. The TEM images indicate that, as expected, there is a thin native oxide layer formed on Si substrates. To enable electrical characterization of the dielectric films, Al top electrodes can be sputtered while using shadow masks. The continuous Al bottom electrodes are deposited by using electron beam evaporation. To identify the DC permittivities of the films, the capacitance-voltage (C-V) measurements of the fabricated metal-oxide-semiconductor MOS capacitors at 100 kHz can be used. The DC permittivities of the exemplary fabricated $Al_2O_3$, $HfO_2$, and HAOL films are 10.5, 17.8, and 22, respectively. By using current-voltage (I-V) measurements, the breakdown fields of the fabricated $Al_2O_3$, $HfO_2$, and HAOL films are 7.36 MV/cm, 3.1 MV/cm, and 7.21 MV/cm, respectively.

FIG. 16 illustrates TEM images of (panel a) the $Al_2O_3$ control sample deposited via 20 ALD cycles and (panel b) the $HfO_2$ control sample deposited via 60 ALD cycles. The scale bar (1605) is 2 nm. The exemplary ITO films can be deposited via room-temperature RF sputtering. The deposition pressure is 3 mTorr while the applied RF power is 48 W. The plasma can be struck with Ar gas with the flow rate of 20 sccm. The argon/oxygen gas ($Ar/O_2$:90%/10%) flow rate can be varied to achieve different carrier concentrations of ITO. In order to characterize the deposited ITO, Hall measurements and spectroscopic ellipsometry can be performed. To this end, ITO films can be sputtered on quartz and silicon substrates by changing the $Ar+O_2$ flow rate while keeping other parameters constant. The deposition rate of ITO in this example can be identified to be about 1 nm/minute, when the mentioned deposition parameters are used. Thus, ITO can be sputtered for 5 minutes to obtain 5 nm-thick ITO films. Hall measurements can then be performed on the films deposited on quartz substrates, and spectroscopic ellipsometry can be performed on the films deposited on silicon substrates. After obtaining the charge carrier concentration $N_{ITO}$ and electron mobility μ of the ITO films from Hall measurements, and using the relation $$\rho = \frac{1}{qN_{ITO}\mu} = \frac{m*m_e}{N_{ITO}q^2\tau},$$

it is possible to obtain the complex permittivity of the ITO films via an ellipsometry fit to a single Drude function $$\varepsilon_{ITO} = \varepsilon_\infty - \frac{\omega_p^2}{\omega^2 + i\Gamma\omega}.$$

Here, Γ is the damping constant, and $\omega_p$ is the plasma frequency, which is related to the charge carrier density $$N_{ITO} \text{ via } \omega_p = \sqrt{\frac{N_{ITO}e^2}{\epsilon_0 m^*}}.$$

Here, e, $\epsilon_0$, and m* are the electron charge, the dielectric permittivity of vacuum, and the effective electron mass, respectively. The high-frequency permittivity $\varepsilon_\infty$, damping rate Γ, and electron effective mass m* are determined via fitting the Drude model to the measured ellipsometry data. Thus, the dielectric permittivity of ITO $\varepsilon_{ITO}$ is related to the plasma frequency $\omega_p$ via Drude model, and the plasma frequency itself depends on the carrier concentration of ITO $N_{ITO}$. This fact is a reason why the optical response of the metasurface is modulated under applied bias. The electrical and optical constants obtained from Hall measurements and spectroscopic ellipsometry are listed in Table 1, which lists the electrical and optical parameters obtained from Hall measurements and spectroscopic ellipsometry for the ITO films deposited using different $Ar+O_2$ flows rates.

When fabricating the dual-gated metasurfaces, it is possible to deposit HAOL on top of ITO. Since, in some embodiments, the HAOL layer needs to be RTA-treated at 600° C. for 30 seconds, it is possible to take into account the effect of the RTA treatment on properties of ITO. To investigate this effect, it is possible to fabricate two identical ITO samples and perform RTA treatment at 600° C. for 30 seconds on one of the samples. Hall measurements and ellipsometry are carried out on both samples to compare the results. As seen in Table 1, the fitted parameters are in good agreement with the expected final thicknesses of the films and literature values for the constants (Γ=0.1185 eV, m*=0.35 $m_e$ and $\epsilon_\infty$=3.9), which are used to define the dielectric permittivity of ITO in the simulations. The bulk charge carrier concentration of ITO can be considered to be $N_{ITO}$=3×10²⁰ cm⁻³ which draws parallel to the plasma frequency of $\omega_p$=1.0874 eV.

TABLE 1

| Ar + $O_2$ flow rate [sccm] | Fitted thickness [nm] as deposited | Fitted thickness [nm] after RTA | $\epsilon_\infty$ as deposited | $\epsilon_\infty$ after RTA | $\omega_p$ [eV] as deposited | $\omega_p$ [eV] after RTA | γ [eV] as deposited | γ [eV] after RTA |
|---|---|---|---|---|---|---|---|---|
| 0   | 4.3637 | 4.3137 | 6.0853 | 5.8447    | 1.8516 | 1.924   | 0.16245 | 0.14188 |
| 0.4 | 5.3566 | 5.1242 | 6.4603 | 5.402     | 1.9679 | 1.2989  | 0.14092 | 0.12521 |
| 0.5 | 5.2988 | 5.3237 | 5.1834 | 4.8832    | 1.4075 | 0.94404 | 0.16379 | 0.12981 |
| 0.6 | 4.0852 | 6.4846 | 5.338  | 5.0306    | 1.4496 | 1.0185  | 0.15081 | 0.11095 |
| 0.7 | 5.5826 | 5.3170 | 5.9536 | 4.689 ± 0 | 1.7932 | 0.86608 | 0.13828 | 0.1543  |

TABLE 1-continued

| Ar + O$_2$ flow rate [sccm] | Fitted thickness [nm] as deposited | Fitted thickness [nm] after RTA | $\epsilon_\infty$ as deposited | $\epsilon_\infty$ after RTA | $\omega_p$ [eV] as deposited | $\omega_p$ [eV] after RTA | $\gamma$ [eV] as deposited | $\gamma$ [eV] after RTA |
|---|---|---|---|---|---|---|---|---|
| 0.8 | 5.4923 | 5.8453 | 5.6552 | 5.1296 | 1.5872 | 1.1351 | 0.14384 | 0.14262 |
| 0.9 | 5.6060 | 5.5593 | 5.1672 | 5.6363 | 1.285 | 1.4352 | 0.14187 | 0.13105 |
| 1 | 6.2157 | 6.0063 | 5.5049 | 5.4699 | 1.4416 | 1.2529 | 0.13843 | 0.12189 |

When fabricating the metasurface it is possible to deposit ITO at Ar+O$_2$ flow rates of 0.6 sccm. In this case, the plasma frequency and the charge carrier concentration of ITO after RTA treatment is $\omega_p$=1.0185 eV and N=2.6319×10$^{20}$ cm$^{-3}$, respectively. It can be noted that after depositing top gate dielectric on ITO, the carrier concentration of ITO is expected to increase due to the leakage of oxygen from the ITO layer into the dielectric that occurs during ALD process.[7] As a result, it can be expected for the carrier concentration of ITO in the device to be slightly higher than the values obtained via Hall measurements.

Figure 17:
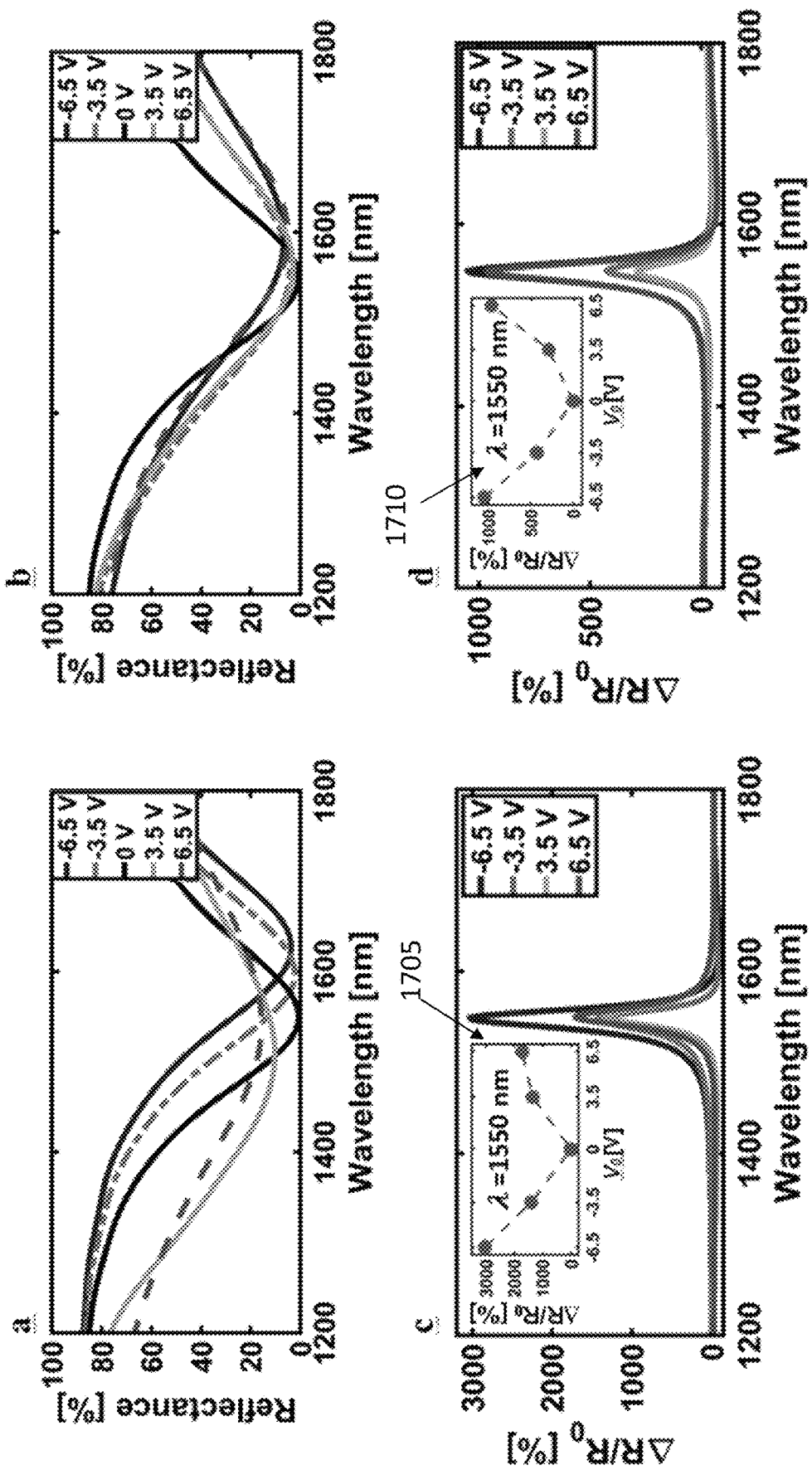
FIGS. 17-19 illustrates different properties of metasurfaces.

The simulated reflectance spectra for different applied biases for Case I and Case II are presented in FIG. 17 panels a, b. FIG. 17 panels c, d show the spectra of relative reflectance change at different applied voltages for Case I and Case II, respectively. The insets (1705,1710) of FIG. 17 panels 7c, d show the relative reflectance change as a function of voltage at a fixed wavelength of 1550 nm.

FIG. 17 illustrates reflectance spectra for different applied biases for (panel a) Case I and (panel b) Case II. The relative reflectance change spectra for different applied voltages for (panel c) Case I and (panel d) Case II. The insets show the relative reflectance change as a function of voltage at a wavelength of 1550 nm.

Figure 18:
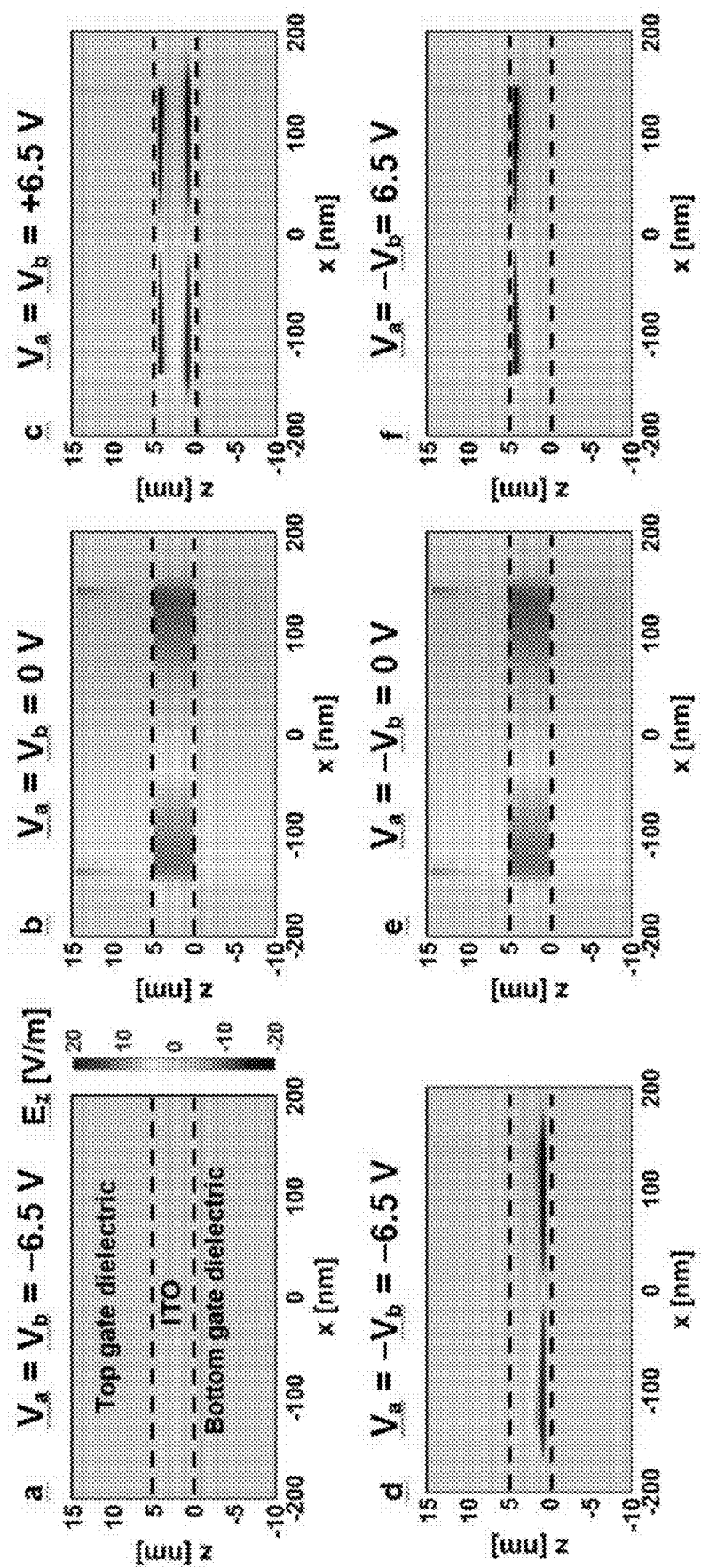

FIG. 18 shows the spatial distribution of the z-component of the electric field $E_z$ inside the dielectric spacer of the metasurface, which consists of HAOL/ITO/HAOL planar layers. The spatial distribution of $E_z$ is calculated at a wavelength of λ=1550 nm. FIG. 18 panels a-c correspond to the bias application configuration that is referred to as Case I (FIG. 12 panel a), while FIG. 18 panels d-f correspond to the bias application configuration referred to as Case II (FIG. 12 panel d). Both in Case I and Case II the assumed values of the applied bias are V$_0$=−6.5 V, V$_0$=0 V and, V$_0$=6.5 V (for definition of V$_0$ see FIG. 12). As seen in FIG. 18 panels c-d and f, there is strong field enhancement at the interfaces of ITO and HAOL. FIG. 18 also shows that the z component of the electric field $E_z$ around right and left edges of the antenna are antiparallel to each other.

FIG. 18 illustrates a close-up image of the spatial distribution of the z component of electric field in the HAOL/ITO/HAOL region for (panel a) V$_0$=−6.5 V in Case I, (panel b) V$_0$=0 V in Case I, (panel c) V$_0$=+6.5 V in Case I, (panel d) V$_0$=−6.5 V in Case II, (panel e) V$_0$=0 V in Case II, and (panel f) V$_0$=+6.5 V in Case II.

Figure 19:
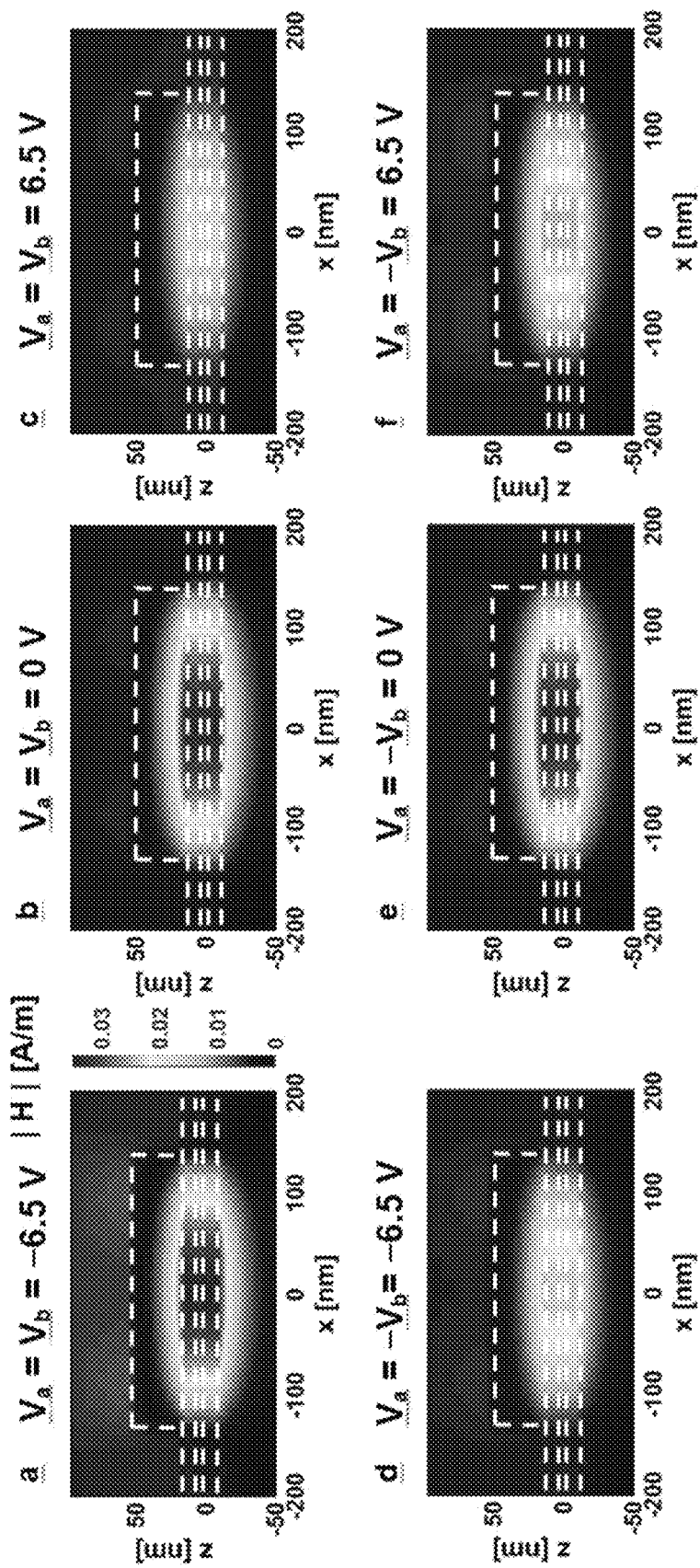

FIG. 19 plots the spatial distribution of the absolute value of the magnetic field for the dual-gated metasurfaces. FIG. 19 panels a-c correspond to Case I, while FIG. 19 panels d-f correspond to Case II. Both in Case I and Case II the following values of applied bias voltages are assumed: V$_0$=−6.5 V, V$_0$=0 V and, V$_0$=6.5 V. As seen in FIG. 19, the magnetic field is localized in the gap region between the Al antenna and the back reflector. This proves the existence of a magnetic dipole resonance. As seen in FIG. 19, the strength of the magnetic dipole is strongly modified by applied voltage.

Figure 20:
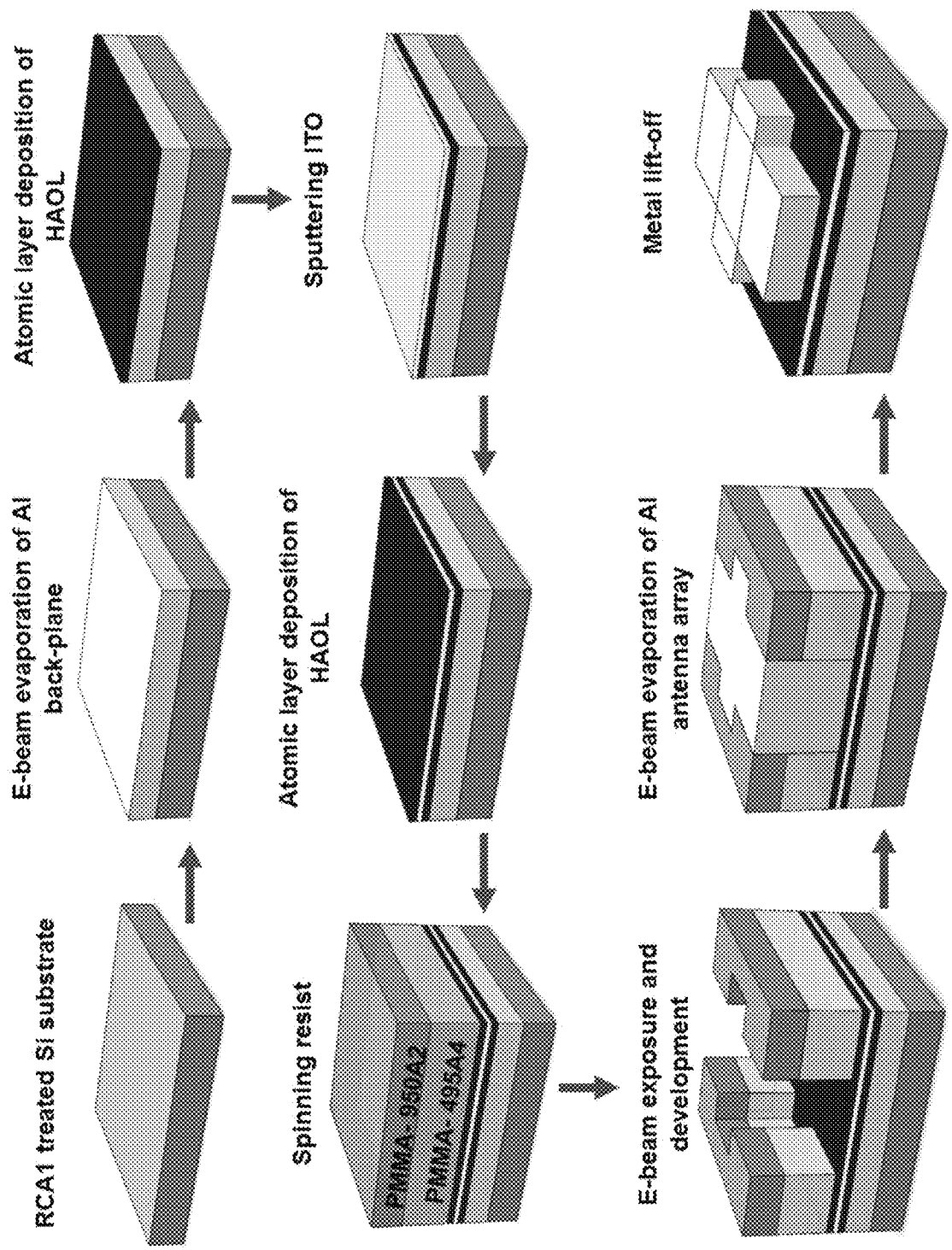
FIG. 20 illustrates an exemplary fabrication process of a metasurface.

In some embodiments, in order to fabricate the gate-tunable metasurface, RCA1 cleaning (H$_2$O:NH$_4$OH:H$_2$O$_2$=5:1:1) of silicon substrates is first performed. Then by using e-beam evaporation, it is possible to deposit a 120 nm-thick aluminum back reflector. On top of the Al back reflector it is possible to deposit an 8 nm-thick HAOL by using ALD. It is the possible to deposit a 5 nm-thick ITO layer on top of the HAOL gate dielectric by using RF magnetron sputtering in Ar/O$_2$ plasma environment. Once the ITO layer is sputtered, it is possible to deposit another 8 nm-thick HAOL layer. Afterwards, e-beam resist can be spun on our Si/Al/HAOL/ITO/HAOL planar sample and Al fishbone antenna arrays and contact pads can be patterned via standard e-beam lithography. After developing the e-beam-exposed sample, it is possible to deposit Al by using e-beam evaporation. The fishbone dual-gated metasurface is obtained after performing lift-off process. FIG. 20 summarizes the described exemplary fabrication steps for the tunable metasurface, although different fabrication techniques may also be used.

To confirm that it is advantageous to use dual-gated metasurfaces as compared to single-gated ones, it is possible to calculate the phase shift of light reflected from a metasurface, when only the ITO layer and the fishbone antennas are biased with respect to each other. FIG. 21a shows the reflectance as a function of wavelength and applied bias. FIG. 21b plots reflectance and FIG. 21c shows relative reflectance change spectrum for different applied voltages. The reflectance as a function of applied bias voltage for three different wavelengths close to the resonance wavelength is depicted in FIG. 21d. FIG. 21e shows the spectrum of the acquired phase. FIG. 21f plots the phase shift as a function of applied voltage for wavelengths of λ=1545 nm, λ=1550 nm, and λ=1555 nm. As seen in FIG. 21f, when we change the voltage from −6.5 V to +6.5 V, the phase shift changes from 58° to −212.8° for λ=1545 nm, from 75.6° to −185.2° for λ=1550 nm, and from 93° to −156.8° for λ=1555 nm. Therefore, the maximum achievable phase shift for the single-gated metasurface is ~271°, which is 74° smaller as compared to the phase shift obtained from the dual-gated metasurface.

Figure 21:
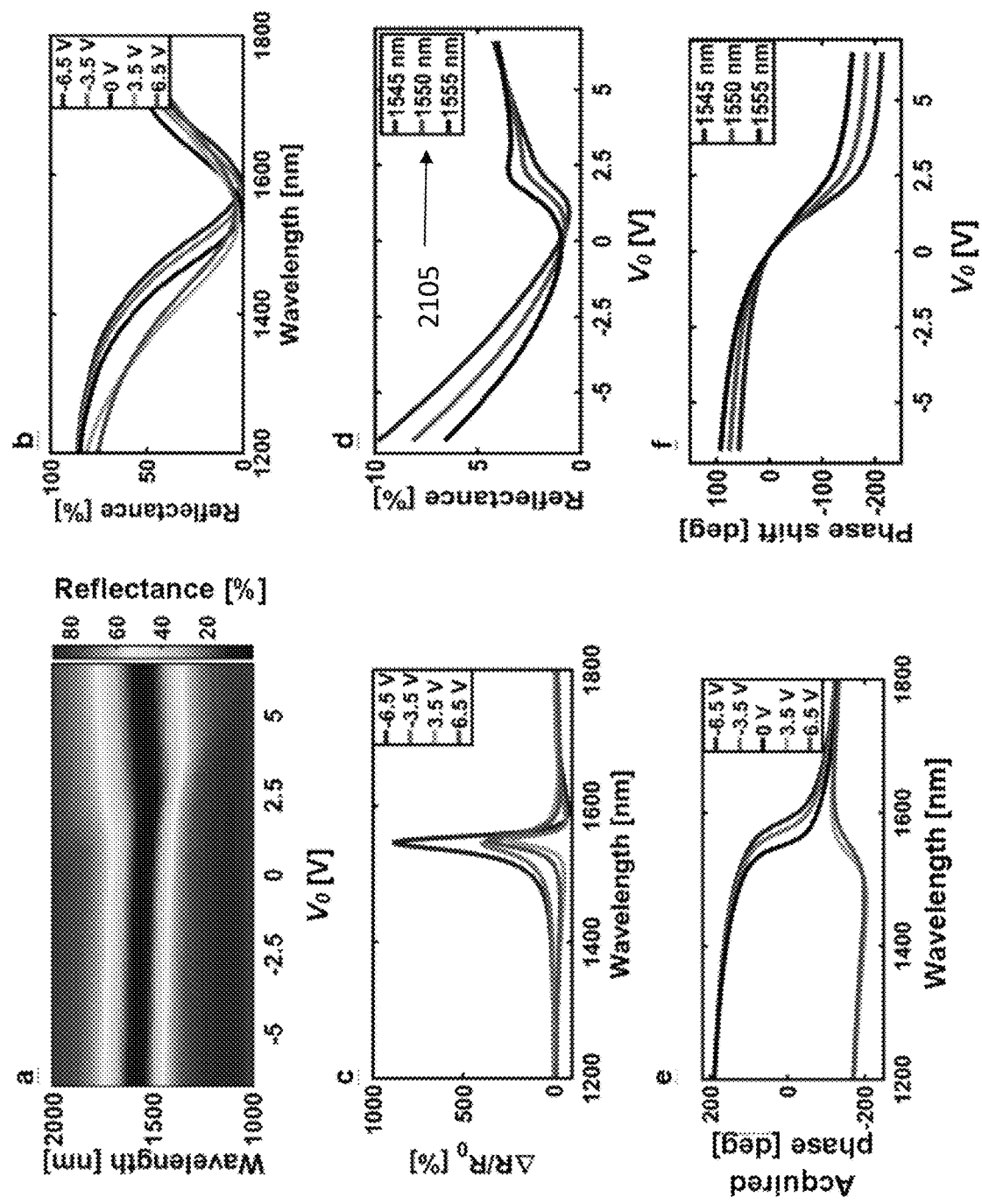
FIG. 21 illustrates a comparison of single and dual gated metasurfaces.

FIG. 21 illustrates: (panel a) Reflectance from the single-gated metasurface as a function of wavelength and applied bias, (panel b) reflectance and (panel c) relative reflectance change spectra for different applied voltages. (panel d) Reflectance from the single-gated metasurface as a function of applied bias voltage for three different wavelengths close to the resonance wavelength. (panel e) Spectra of the acquired phase for different applied biases. (panel f) Phase shift as a function of applied voltage at wavelengths mentioned in the legend (2105) of (panel d).

A number of embodiments of the disclosure have been described. Nevertheless, it will be understood that various modifications may be made without departing from the spirit and scope of the present disclosure. Accordingly, other embodiments are within the scope of the following claims.

When nanolaminates and multiple gates are used, the voltages may be applied, for example, to the top or bottom, or middle surfaces of each nanolaminate.

In some embodiments, each unit cell may comprise a back reflector; an antenna; a plurality of gate dielectric layers between the antenna and the back reflector; a plurality of transparent index-change layer between the antenna and the back reflector, each transparent index-change layer between two gate dielectric layers of the plurality of gate dielectric layers; a plurality of electric conductors, each conductor of the plurality of electric conductors connecting a transparent index-change layer of the plurality of transparent index-change layers to: the antenna, the back reflector, or another transparent index-change layer of the plurality of transparent index-change layers; wherein: each electric conductor of the plurality of electric conductors is configured to apply an independent voltage bias and generate a charge accumulation layer or a charge depletion layer between a transparent index-change layer and adjacent gate dielectric layers.

As known to the person of ordinary skill in the art, a patch antenna (also known as a rectangular microstrip antenna) is a type of radio antenna with a low profile, which can be mounted on a flat surface. It consists of a flat rectangular sheet or patch of metal, which can be mounted over a larger sheet of metal called a ground plane.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

[1] Huang, Y.-W. et al. Gate-Tunable Conducting Oxide Metasurfaces. Nano Letters 16, 5319-5325 (2016).
[2] Yota, J. et al. ALD HfO2, Al2O3, and PECVD Si3N4 as MIM Capacitor Dielectric for GaAs HBT Technology, CS ManTech (2014)
[3] Yu, N.; Genevet, P.; Kats, M. A.; Aieta, F.; Tetienne, J.-P.; Capasso, F.; Gaburro, Z. *Science* 2011, 334, (6054), 333-337.
[4] Nanfang, Y.; Capasso, F. *Nat. Mater.* 2014, 13, 139-150.
[5] Arbabi, A.; Horie, Y.; Bagheri, M.; Faraon, A. *Nat. Nanotechnol.* 2015, 10, 937-943.
[6] Pors, A.; Nielsen, M. G.; Eriksen, R. L.; Bozhevolnyi, S. I. *Nano Lett.* 2013, 13, (2), 829-834.
[7] Khorasaninejad, M.; Chen, W. T.; Devlin, R. C.; Oh, J.; Zhu, A. Y.; Capasso, F. *Science* 2016, 352, (6290), 1190-1194.
[8] Huang, Y.-W.; Chen, W. T.; Tsai, W.-Y.; Wu, P. C.; Wang, C.-M.; Sun, G.; Tsai, D. P. *Nano Lett.* 2015, 15, 3122-3127.
[9] Zheng, G.; Muhlenbernd, H.; Kenney, M.; Li, G.; Zentgraf, T.; Zhang, S. *Nat. Nanotechnol.* 2015, 10, 308-312.
[10] Chen, W. T.; Yang, K.-Y.; Wang, C.-M.; Huang, Y.-W.; Sun, G.; Chiang, I.-D.; Liao, C. Y.; Hsu, W.-L.; Lin, H. T.; Sun, S. *Nano Lett.* 2014, 14, 225-230.
[11] Black, L.-J.; Wang, Y.; Groot, C. H. d.; Arbouet, A.; Muskens, O. L. *ACS Nano* 2014, 8, (6), 6390-6399.
[12] Wu, P. C.; Tsai, W.-Y.; Chen, W. T.; Huang, Y.-W.; Chen, T.-Y.; Chen, J.-W.; Liao, C. Y.; Chu, C. H.; Sun, G.; Tsai, D. P. *Nano Lett.* 2017, 17, (1), 445-452.
[13] Sherrott, M. C.; Hon, P. W. C.; Fountaine, K. T.; Garcia, J. C.; Ponti, S. M.; Brar, V. W.; Sweatlock, L. A.; Atwater, H. A. *Nano Lett.* 2017, 17, (3027-3034).
[14] Dabidian, N.; Kholmanov, I.; Khanikaev, A. B.; Tatar, K.; Trendafilov, S.; Mousavi, S. H.; Magnuson, C.; Ruoff, R. S.; Shvets, G. *ACS Photonics* 2015, 2, (2), 216-227.
[15] Yao, Y.; Kats, M. A.; Genevet, P.; Yu, N.; Song, Y.; Kong, J.; Capasso, F. *Nano Lett.* 2013, 13, (3), 1257-1264.
[16] Jun, Y. C.; Reno, J.; Ribaudo, T.; Shaner, E.; Greffet, J.-J.; Vassant, S.; Marquier, F.; Sinclair, M.; Brener, I. *Nano Lett.* 2013, 13, (11), 5391-5396.
[17] Park, J.; Kang, J.-H.; Liu, X.; Brongersma, M. L. *Sci. Rep.* 2015, 15, (15754).
[18] Lewi, T.; Evans, H. A.; Butakov, N. A.; Schuller, J. A. *Nano Lett.* 2017, 17, (6), 3940-3945.
[19] Iyer, P. P.; Pendharkar, M.; Palmstrom, C. J.; Schuller, J. A. *Nat Commun* 2017, 8.
[20] Cencillo-Abad, P.; Ou, J.-Y.; Plum, E.; Valente, J.; Zheludev, N. I. *Nanotechnology* 2016, 27, (485206).
[21] Ou, J.-Y.; Plum, E.; Zhang, J.; Zheludev, N. I. *Nat. Nanotechnol.* 2013, 8, 252-255.
[22] Valente, J.; Ou, J.-Y.; Plum, E.; Youngs, I. J.; Zheludev, N. I. *Nat. Commun.* 2015, 6, (7021).
[23] Zhu, Z. H.; Evans, P. G.; Haglund, R. F.; Valentine, J. G. *Nano Lett* 2017, 17, (8), 4881-4885.
[24] Decker, M.; Kremers, C.; Minovich, A.; Staude, I.; Miroshnichenko, A. E.; Chigrin, D.; Neshev, D. N.; Jagadish, C.; Kivshar, Y. S. *Opt Express* 2013, 21, (7), 8879-8885.
[25] Sautter, J.; Staude, I.; Decker, M.; Rusak, E.; Neshev, D. N.; Brener, I.; Kivshar, Y. S. *Acs Nano* 2015, 9, (4), 4308-4315.
[26] Olivieri, A.; Chen, C.; Hassan, S.; Lisicka-Skrzek, E.; Tait, R. N.; Berini, P. *Nano Lett* 2015, 15, (4), 2304-2311.
[27] de Galarreta, C. R.; Alexeev, A. M.; Au, Y.-Y.; Lopez-Garcia, M.; Klemm, M.; Cryan, M.; Bertolotti, J.; Wright, C. D. *Advanced Functional Materials* 2018, 1704993.
[28] Thyagarajan, K.; Sokhoyan, R.; Zornberg, L.; Atwater, H. A. *Adv Mater* 2017, 29, (31).
[29] Heck, M. J. R. *Nanophotonics* 2017, 6, (1), 93-107.
[30] Sun, J.; Timurdogan, E.; Yaacobi, A.; Hosseini, E. S.; Watts, M. R. *Nature* 2013, 493, 195-199.
[31] Yaacobi, A.; Sun, J.; Moresco, M.; Leake, G.; Coolbaugh, D.; Watts, M. R. *Opt. Lett.* 2014, 39, (15), 4575-4578.
[32] Poulton, C. V.; Yaacobi, A.; Cole, D. B.; Byrd, M. J.; Raval, M.; Vermeulen, D.; Watts, M. R. *Opt. Lett.* 2017, 42, (20), 4091-4094.

[33] Huang, Y.-W.; Lee, H. W. H.; Sokhoyan, R.; Pala, R. A.; Thyagarajan, K.; Han, S.; Tsai, D. P.; Atwater, H. A. *Nano Lett.* 2016, 16, 5319-5325.

[34] Lee, H. W.; Papadakis, G.; Burgos, S. P.; Chander, K.; Kriesch, A.; Pala, R.; Peschel, U.; Atwater, H. A. *Nano Lett.* 2014, 14, (11), 6463-6468.

[35] Vasudev, A. P.; Kang, J.-H.; Park, J.; Liu, X.; Brongersma, M. L. *Opt. Express* 2013, 21, (22), 26387-26397.

[36] Lu, Z.; Zhao, W.; Shi, K. *IEEE Photonics J.* 2012, 4, 735-740.

[37] Lu, J. L. a. W. D. *Adv Mater* 2017, 1702770.

[38] Ye, P. D.; Yang, B.; Ng, K. K.; Bude, J.; Wilk, G. D.; Halder, S.; Hwang, J. C. M. *Appl. Phys. Lett.* 2005, 86, (063501).

[39] Hinkle, C. L.; Sonnet, A. M.; Vogel, E. M.; McDonnell, S. *Appl. Phys. Lett.* 2008, 92, (071901).

[40] Cao, D.; Cheng, X.; Zheng, L.; Xu, D.; Wang, Z.; Xia, C.; Shen, L.; Yu, Y.; Shen, D. *J. Vac. Sci. Technol. B* 2015, 33, (1).

[41] Feigenbaum, E.; Diest, K.; Atwater, H. A. Nano Lett. 2010, 10, 2111-2116.

[42] Lee, H. W.; Papadakis, G.; Burgos, S. P.; Chander, K.; Kriesch, A.; Pala, R. A.; Peschel, U.; Atwater, H. A. Nano Lett. 2014, 14, 6463-6468.

[43] Kim, J. S.; Cacialli, F.; Cola, A.; Gigli, G.; Gingolani, R. Synthetic Met 2000 111, 363-367.

[44] Melikyan, A.; Lindenmann, N.; Walheim, S.; Leufke, P. M.; Ulrich, S.; Ye, J.; Vincze, P.; Hahn, H.; Schimmel, T.; Koos, C.; al., e. Opt. Express 2011, 19, 8855-8869.

[45] Michelotti, F.; Dominici, L.; Descrovi, E.; Danz, N.; Menchini, F. Opt. Lett. 2009, 34, 839-841.

[46] Bayer, T. J. M.; Wachau, A.; Fuchs, A.; Deuermeier, J.; Klein, A. Chemistry of Materials 2012, 24, 4503-4510.

[47] Klein, A.; Korber, C.; Wachau, A.; Sauberlich, F.; Gassenbauer, Y.; Harvey, S. P.; Proffit, D. E.; Mason, T. O. Materials 2010, 3, (11), 4892-4914.

[48] Yi, F.; Shim, E.; Zhu, A. Y.; Zhu, H.; Reed, J. C.; Cubukcu, E. Appl Phys Lett 2013, 102, (22).

What is claimed is:

1. A structure comprising:
   a back reflector;
   a first gate dielectric on the back reflector;
   a transparent index-change layer on the first gate dielectric, the transparent index-change layer having an electrically tunable refractive index;
   a second gate dielectric on the transparent index-change layer;
   an antenna on the second gate dielectric,
   a first electric conductor connecting the transparent index-change layer and the back reflector, the first electric conductor configured to apply a first voltage bias between the transparent index-change layer and the back reflector; and
   a second electric conductor connecting the transparent index-change layer and the antenna, the second electric conductor configured to apply a second voltage bias between the transparent index-change layer and the antenna,
   wherein:
   the first voltage bias is configured to generate a first charge accumulation layer or first charge depletion layer between the transparent index-change layer and the first gate dielectric, and
   the second voltage bias is configured to generate a second charge accumulation layer or second charge depletion layer between the transparent index-change layer and the second gate dielectric.

2. The structure of claim 1, wherein the back reflector is made of Au, Ag, TiN or Al.

3. The structure of claim 1, wherein the first gate dielectric and the second gate dielectric each are nanolaminates comprising alternating layers of two different transparent conductive oxides.

4. The structure of claim 3, wherein the transparent conductive oxides are $HfO_2$ and $Al_2O_3$.

5. The structure of claim 4, wherein the alternating layers comprise 2.5 nm thick layers of $HfO_2$ and 1.4 nm thick layers of $Al_2O_3$.

6. The structure of claim 1, wherein the transparent index-change layer is a transparent conducting oxide.

7. The structure of claim 1, wherein the transparent index-change layer comprises a material selected from the group consisting of: a transition metal nitride, Si, a III-V semiconductor compound, a II-VI semiconductor compound, and a semiconductor.

8. The structure of claim 6, wherein the transparent conducting oxide is indium tin oxide or indium zinc oxide.

9. The structure of claim 1, wherein the back reflector is a distributed Bragg reflector.

10. The structure of claim 1, wherein the first charge accumulation layer or first charge depletion layer and the second charge accumulation layer or second charge depletion layer are configured to electrically tune the refractive index of the transparent index-change layer.

11. The structure of claim 1, wherein the back reflector, the first gate dielectric, the transparent index-change layer, the second gate dielectric and the antenna are configured to modify a phase of an incident electromagnetic wave reflected by the back reflector.

12. A structure comprising:
    a back reflector;
    an antenna;
    a plurality of gate dielectric layers between the antenna and the back reflector;
    a plurality of transparent index-change layer between the antenna and the back reflector, each transparent index-change layer between two gate dielectric layers of the plurality of gate dielectric layers; and
    a plurality of electric conductors, each conductor of the plurality of electric conductors connecting a transparent index-change layer of the plurality of transparent index-change layers to:
    the antenna,
    the back reflector, or
    another transparent index-change layer of the plurality of transparent index-change layers,
    wherein:
    each electric conductor of the plurality of electric conductors is configured to apply a voltage bias to a transparent index-change layer of the plurality of transparent index-change layers and generate a charge accumulation layer or a charge depletion layer between the transparent index-change layer of the plurality of transparent index-change layers and adjacent gate dielectric layers.

13. The structure of claim 12, wherein the transparent index-change layer is a transparent conducting oxide.

14. The structure of claim 13, wherein the transparent conducting oxide is indium tin oxide or indium zinc oxide.

15. An array of individually addressable unit cells, each unit cell comprising the structure of claim 1.

16. The array of claim 15, wherein the array is configured to provide continuous beam steering of an incident electromagnetic wave reflected by the array.

17. An array of individually addressable unit cells, each unit cell comprising the structure of claim 12.

* * * * *